United States Patent
Mohammad et al.

(10) Patent No.: US 9,743,213 B2
(45) Date of Patent: Aug. 22, 2017

(54) ENHANCED AUDITORY EXPERIENCE IN SHARED ACOUSTIC SPACE

(71) Applicant: QUALCOMM Incorporated, San Diego, CA (US)

(72) Inventors: Asif Iqbal Mohammad, San Diego, CA (US); Erik Visser, San Diego, CA (US); Lae-Hoon Kim, San Diego, CA (US); Shaun William Van Dyken, San Diego, CA (US); Troy Schultz, San Diego, CA (US); Samir Kumar Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/808,967

(22) Filed: Jul. 24, 2015

(65) Prior Publication Data

US 2016/0174010 A1 Jun. 16, 2016

Related U.S. Application Data

(60) Provisional application No. 62/091,391, filed on Dec. 12, 2014.

(51) Int. Cl.
*H04S 7/00* (2006.01)
*H04R 5/02* (2006.01)
(Continued)

(52) U.S. Cl.
CPC ............ *H04S 7/302* (2013.01); *H04M 3/568* (2013.01); *H04M 9/082* (2013.01); *H04R 5/02* (2013.01);
(Continued)

(58) Field of Classification Search
CPC ........ H04R 2499/13; H04R 5/02; H04R 5/04; H04S 7/302; H04S 2400/09; H04M 3/568;
(Continued)

(56) References Cited

U.S. PATENT DOCUMENTS 6,505,057 B1 * 1/2003 Finn .................... G10L 21/0208
455/557
6,980,663 B1 12/2005 Linhard
(Continued)

FOREIGN PATENT DOCUMENTS

EP 1070417 A1 1/2001
EP 1591995 A1 11/2005

OTHER PUBLICATIONS

Day, R., et al., "Using Spatial Audio in Minimal Attention Interfaces: Towards an Effective Audio GPS Navigation System," Technical Report No. 2004/08, Mar. 11, 2004, The Open University, Walton Hall, Milton Keynes, UK, pp. 1-14.
(Continued)

*Primary Examiner* — Mark Fischer
(74) *Attorney, Agent, or Firm* — Toler Law Group, P.C.

(57) ABSTRACT

A multichannel acoustic system (MAS) comprises an arrangement of microphones, loudspeakers, and filters along with a multichannel acoustic processor (MAP) and other components to together provide and enhance the auditory experience of persons in a shared acoustic space such as, for example, the driver and other passengers in an automobile. Driver-specific features such as navigation and auditory feedback cues are described, as individual auditory customizations and collective communications both within the shared acoustic space as well as with other individuals not located in the space via enhanced conference call facilities.

19 Claims, 15 Drawing Sheets

(51) Int. Cl.
  *H04R 5/04* (2006.01)
  *H04M 3/56* (2006.01)
  *H04M 9/08* (2006.01)
  *G10L 21/0208* (2013.01)
  *G10L 21/0216* (2013.01)

(52) U.S. Cl.
  CPC ...... *H04R 5/04* (2013.01); *G10L 2021/02082* (2013.01); *G10L 2021/02166* (2013.01); *H04R 2499/13* (2013.01); *H04S 2400/09* (2013.01)

(58) Field of Classification Search
  CPC ......... H04M 9/082; G10L 2021/02082; G10L 2021/02166
  See application file for complete search history.

(56) References Cited

U.S. PATENT DOCUMENTS

| | | | |
|---|---|---|---|
| 8,190,438 | B1 | 5/2012 | Nelissen |
| 2002/0071573 | A1* | 6/2002 | Finn .................... G10L 21/0208 381/93 |
| 2003/0032460 | A1* | 2/2003 | Cannon ............... H04M 1/6091 455/569.2 |
| 2003/0081115 | A1* | 5/2003 | Curry ..................... H04M 3/56 348/14.12 |
| 2005/0159945 | A1 | 7/2005 | Otsuka et al. |
| 2006/0133619 | A1 | 6/2006 | Curry et al. |
| 2006/0262935 | A1 | 11/2006 | Goose et al. |
| 2007/0200663 | A1* | 8/2007 | White .................... A61B 5/117 340/5.31 |
| 2008/0273722 | A1 | 11/2008 | Aylward et al. |
| 2009/0112589 | A1* | 4/2009 | Hiselius ................ H04M 1/576 704/246 |
| 2013/0170668 | A1 | 7/2013 | Hess et al. |

OTHER PUBLICATIONS

International Search Report and Written Opinion for International Application No. PCT/US2015/058124, ISA/EPO, dated Feb. 8, 2016, 12 pages.

\* cited by examiner

ENHANCED AUDITORY EXPERIENCE IN SHARED ACOUSTIC SPACE

CROSS-REFERENCE TO RELATED APPLICATIONS

This patent application claims the benefit of Provisional Application No. 62/091,391, filed Dec. 12, 2014, entitled "ENHANCED AUDITORY EXPERIENCE IN SHARED ACOUSTIC SPACE", which is incorporated by reference herein in its entirety and to which priority is claimed.

BACKGROUND

In a shared acoustic space, such as the passenger compartment of an automobile, for example, various passengers (including the driver) may participate in a variety of activities each having their own acoustical accompaniments. For example, a driver may be listening to navigation commands and alert for auditory traffic cues while also enjoying classical music while a second passenger is engaged in a mobile phone conversation, a third passenger is enjoying an audio/video presentation (with images and sound), and a fourth passenger in the front row of the vehicle is enjoying a conversation with a fifth passenger in a third-row seat. However, all of these different activities may have accompanying sounds that are competing with each other in the shared acoustic space as well as competing with other sources of noise (e.g., other ambient noise present in the vehicle which may be in closer proximity to or between the front seat passenger and the third-row seat passenger, as well as other sources of noise common to a moving vehicle, e.g., engine noise, road noise, traffic noise, etc.) and/or the physical limitations of the environment (e.g., the distance between the parties and the orientation of the front seat passenger away from the third-row seat passenger, as well as the uncomfortable and unsafe turning of the body and head of the front seat passenger towards the back of the vehicle).

SUMMARY

Various implementations disclosed herein are directed to a multichannel acoustic system (MAS) comprising an arrangement of microphones, loudspeakers, and filters along with a multichannel acoustic processor (MAP) and other components to together provide and enhance the auditory experience of persons in a shared acoustic space such as, for example, the driver and other passengers in an automobile. Accordingly, several implementations are directed to the integration of a MAS into an automobile, while other implementations are directed to the integration of MAS into other forms of transportation (e.g., planes, trains, motorcycles, boats, etc.) and yet other implementations are directed to non-transportation shared acoustic spaces such as theaters, conference rooms, presentation halls, and anywhere a public address system might be utilized. Several implementations focus on driver-specific features such as navigation and auditory feedback cue while other such implementations focus on individual customizations and collective communications both within the shared acoustic space as well as with other individuals not located in the space (via a conference call, for example).

More particularly, various implementations disclosed herein are directed to enhancing an auditory experience in a shared acoustic space using a multichannel acoustic system comprising a plurality of microphones, a plurality of loudspeakers, a plurality of filters, a multichannel acoustic processor, and a mobile communications interface, the shared acoustic space having a plurality of zones, each zone corresponding to each microphone from among the plurality of microphones and each loudspeaker from among the plurality of loudspeakers, the method comprising: receiving, at the plurality of microphones distributed throughout the shared acoustic space, sound signals substantially originating from the plurality of zones; echo filtering and feedback filtering, at a plurality of adaptable sound filters, the sound signals received at each microphone in each zone to cancel at least one echo signal and at least one feedback signal; and reproducing filtered sound signals on the plurality of loudspeakers in the plurality of zones except for the zone in which the filtered sound signal originated. For certain implementations, the shared acoustic space may be an interior passenger compartment of a vehicle for utilization by a plurality of passengers comprising a driver and a set of other passengers, wherein the plurality of loudspeakers and the plurality of microphones are distributed throughout the shared acoustic space in relation to the passenger seats of the vehicle.

Several implementations may further provide, for at least one zone from among the plurality of zones, an interface with at least one portable device located in that zone to operationally couple the portable device to at least one microphone in that zone, to at least one loudspeaker in that zone, or both in order to provide the user of the portable device located in that zone with a personalized audio experience. Certain implementations may further provide, for each zone from among the plurality of zones, an interface capable of operationally coupling a portable device located in each such zone. Select implementations may also provide that, for each zone from among the plurality of zones, the interface capable of operationally coupling a portable device located in each such zone operates in parallel with the other interfaces.

Other implementations may further comprise: providing, by the multichannel acoustic system, a conference call facility that creates, for each passenger from among the plurality of passengers, a multi-dimensional acoustic perception of a plurality of distant participants; and providing, for the plurality of distant participants, a multi-dimensional acoustic perception of the plurality of passengers, wherein the conference call facility is provided by a mobile communications device operationally coupled to the multichannel acoustic system via the mobile communications interface. For some implementations, navigation information may also be provided by the multichannel acoustic system to the driver, the navigation information comprising a directional context such that navigation information corresponding to vehicle left is perceived by a recipient as coming from vehicle left, navigation information corresponding to vehicle right is perceived by a recipient as coming from vehicle right, navigation information corresponding to vehicle front is perceived by a recipient as coming from vehicle front, and navigation information corresponding to vehicle back is perceived by a recipient as coming from vehicle back.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
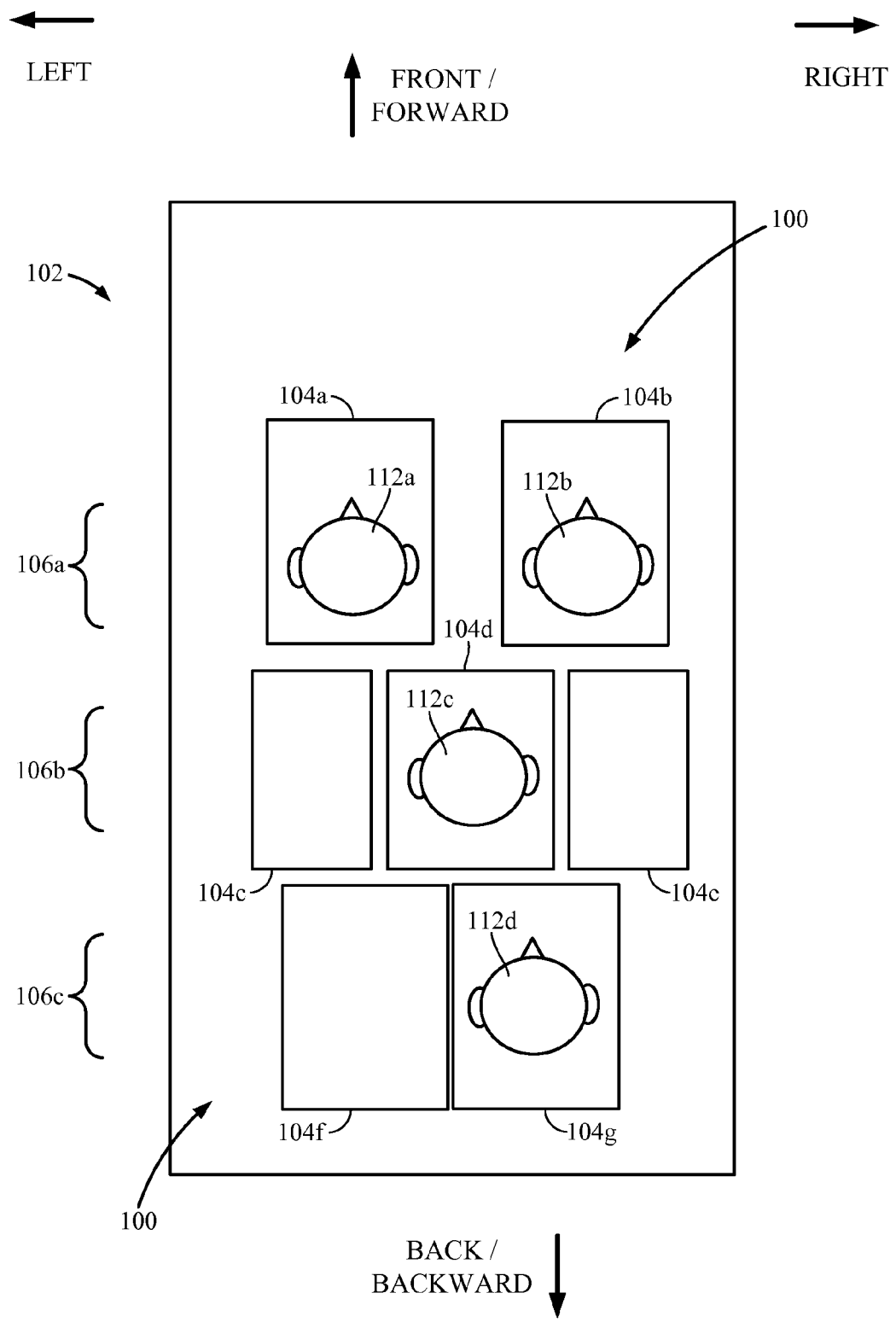
FIG. 1 is a block diagram illustrating an exemplary shared acoustic space—specifically, an automobile having seven seats arranged in three rows—in which various implementations disclosed herein may be implemented.

Unless expressly limited by its context, the term "signal" is used to indicate any of its ordinary meanings, including a state of a memory location (or set of memory locations) as expressed on a wire, bus, or other transmission medium. Unless expressly limited by its context, the term "generating" is used to indicate any of its ordinary meanings, such as computing or otherwise producing. Unless expressly limited by its context, the term "calculating" is used to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least." References to a "location" of a microphone indicate the location of the center of an acoustically sensitive face of that microphone unless otherwise indicated by the context. The term "channel" is used at times to indicate a signal path and at other times to indicate a signal carried by such a path, according to the particular context.

Furthermore, unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one, whereas the term "subset" is used herein to indicate an integer quantity that is greater than or equal to one.

Various implementations disclosed herein are directed to enhancing an auditory experience in a shared acoustic space using a multichannel acoustic system (MAS) comprising a plurality of microphones, a plurality of loudspeakers, a plurality of filters, a plurality of sensors, and a multichannel acoustic processor (MAP), the shared acoustic space being an interior passenger compartment of an automobile vehicle for utilization by a plurality of passengers comprising a driver and a set of other passengers, and the plurality of loudspeakers and the plurality of microphones are distributed throughout the shared acoustic space in relation to the passenger seats of the automobile vehicle, the method comprising: providing, by the MAS, navigation information via a subset of loudspeakers from among the plurality of loudspeakers based on one of a plurality of different recipient configurations selectable by a driver, the different recipient configurations comprising a first recipient configuration for receipt of the navigation information by the driver only, a second recipient configuration for receipt of the navigation information by the driver and another front seat passenger only, and a third configuration for receipt of the navigation information by the driver and the set of other passengers; and providing, by the MAS, a conference call facility that creates, for each passenger from among the plurality of passengers, a multi-dimensional acoustic perception of a plurality of distant participants and, for the plurality of distant participants utilizing one of stereo and surround sound, a multi-dimensional acoustic perception of the plurality of passengers.

For several implementations, navigation information may be provided with a directional context such that navigation information corresponding to vehicle left is perceived by a recipient as coming from vehicle left, navigation information corresponding to vehicle right is perceived by a recipient as coming from vehicle right, navigation information corresponding to vehicle front is perceived by a recipient as coming from vehicle front, and navigation information corresponding to vehicle back is perceived by a recipient as coming from vehicle back.

Certain implementations may also comprise: providing, by the MAS, noise cancellation for sound signals emanating from within the shared acoustic space utilizing a diffused sound field; providing the driver with at least one auditory feedback cue based on a hazard determined by the plurality of sensors of the MAS; enhancing, by the MAS, a conversation between two passengers; filtering, by the MAS, at least one sound signal to cancel echo and to cancel feedback; detecting, by the MAS, a configuration corresponding to where the plurality of passengers are seated within the vehicle; identifying and authenticating, by the MAS, at least one passenger from among the plurality of passengers; and providing, by the MAS, customized auditory playback to each passenger from among the plurality of passengers and/or providing, by the MAS, a plurality of control features to at least one passenger selectable via a personal communications device.

As such, implementations are intended to provide an enhanced acoustic experience in a shared acoustic space through use of the plurality of microphones, loudspeakers, filters, sensors, and/or the multichannel acoustic processor (MAP).

FIG. 1 is an illustration of an exemplary shared acoustic space 100, specifically, the interior passenger compartment of an automobile 102 having seven seats 104a-104g arranged in three rows 106a-106c. As illustrated in FIG. 1, the total number of passengers at any given time (or trip) may range from one to seven configured (i.e., sitting) in a limited number of relatively fixed locations. Thus, the number of physical seating configurations (i.e., occupied seats versus unoccupied seats) is finite and limited, making this particular shared acoustic space 100 well-defined.

For example, in one configuration as illustrated in FIG. 1, four passengers 112a-112d may occupy seats 104a (which, in the configuration shown for the automobile 102, is the driver's seat), 104b (for a front-seat passenger), 104d (for a middle-row center-seat passenger), and 104g (for a third-row seat passenger on the vehicle-right side). Moreover, because this particular shared acoustic space 100 is an automobile 102, it follows that passengers 112a-112d (and especially driver 112a) are generally facing forward (i.e., toward the front of the vehicle). Passenger 112d may have a difficult time clearly and easily hearing passenger 112b, and thus it may be difficult for passengers 112b and 112d to converse with each other. It may also be difficult for the driver 112a to hear noises relevant to driving safely and efficiently, and this situation may be worsened by the noise from the other passengers, the vehicle's engine and movement, any centrally-provided music, and so forth.

One source of potential noise in particular that can interfere with driving is any enhanced or augmented acoustical systems present in the vehicle such as a multichannel acoustic system (MAS) described below. However, an MAS might also provide a robust and unmatched solution for addressing the noise problem for a driver, and various implementations disclosed herein leverage the capabilities of an MAS to provide enhanced auditory feedback to a targeted individual in a shared acoustic space such as in the exemplary context of a driver in an automobile.

Figure 2:
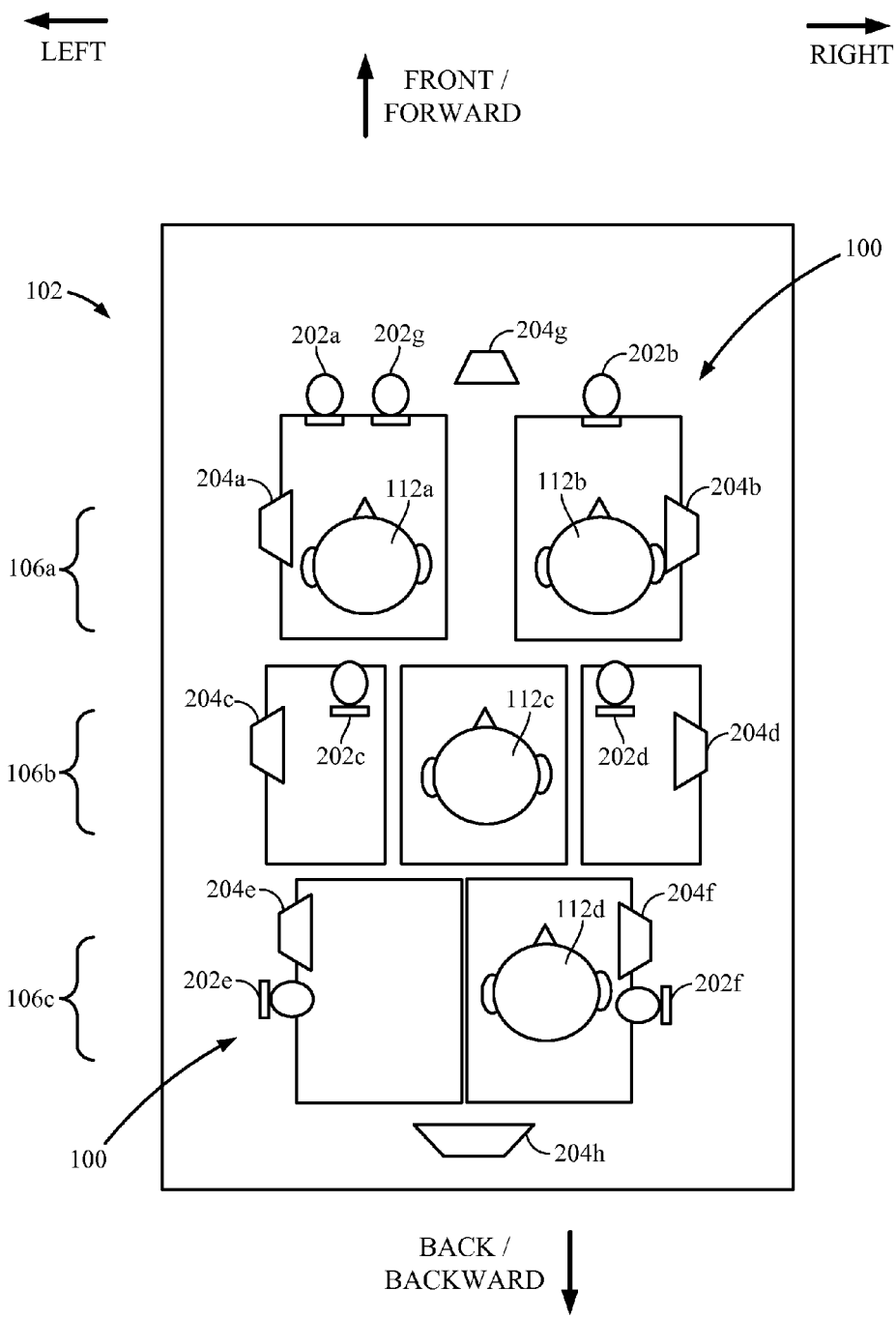
FIG. 2 is a block diagram illustrating the shared acoustic space of the automobile of FIG. 1 incorporating a multi-channel acoustic system (MAS) representative of various implementations disclosed herein.

FIG. 2 illustrates the shared acoustic space 100 of the automobile 102 of FIG. 1 incorporating a multichannel acoustic system (MAS) representative of various implementations disclosed herein. As illustrated, the shared acoustic space 100 of the automobile 102 further comprises a plurality of microphones 202a-202g and loudspeakers 204a-204g which may be the visible or exposed components of the MAS that are communicatively coupled to the multichannel acoustic processor (MAP) integrated throughout the vehicle (and thus not shown) that processes sound inputs and produces enhanced outputs for an improved acoustic experience. For various implementations, the MAP acts to balance sounds across the vehicle by taking sounds generated from any part of the vehicle—received as inputs at one or more of the microphones 202a-202g—and reproducing these sounds on a set or subset of loudspeakers 204a-204g in the other parts of the vehicle.

Figure 3:
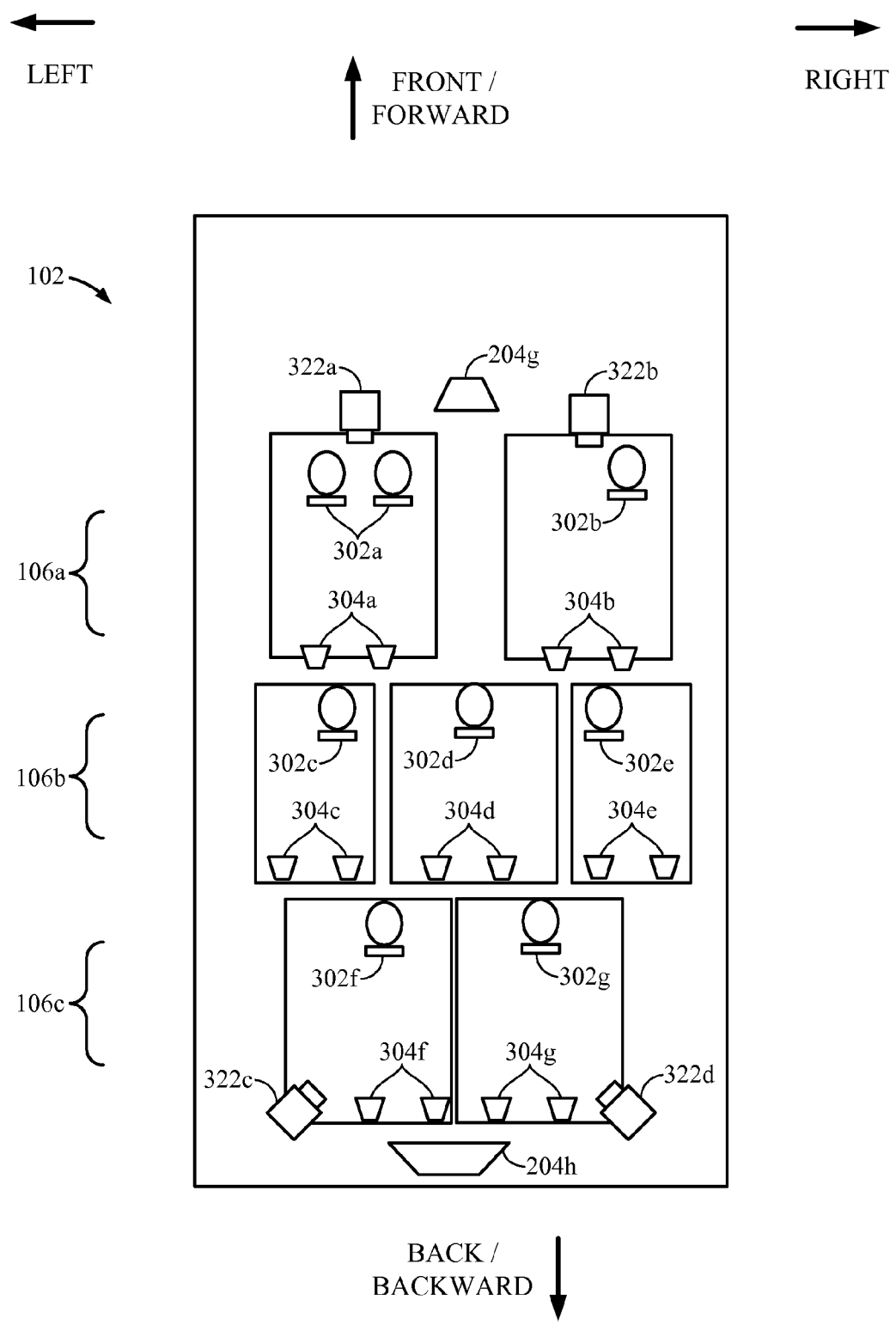
FIG. 3 illustrates the shared acoustic space of the automobile of FIGS. 1 and 2 incorporating a multichannel acoustic system (MAS) reconfigured to provide individual stereo sound to each of the passengers as well as microphones and image/video capture devices.
Figure 4:
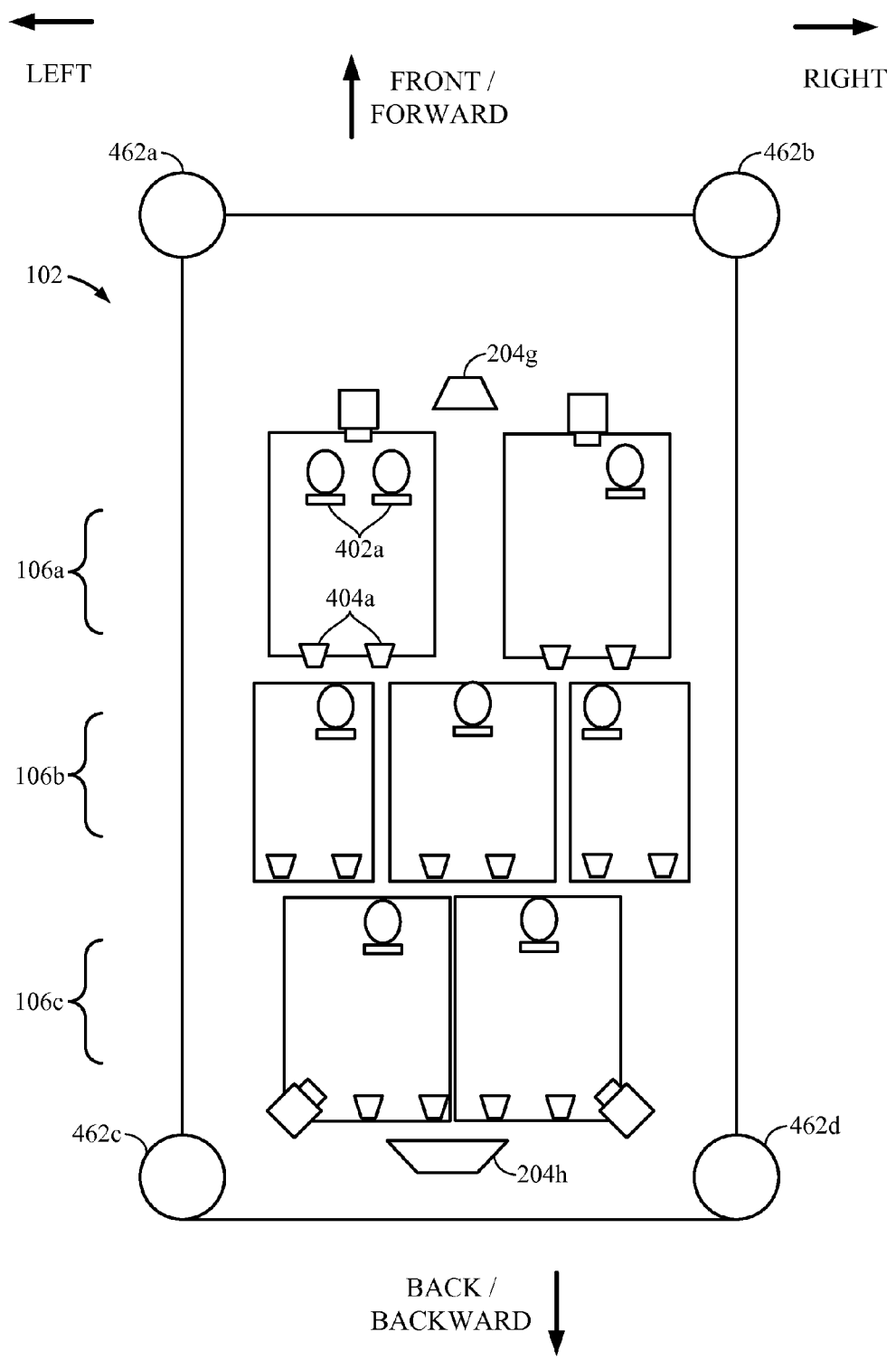
FIG. 4 illustrates the automobile of FIG. 3 that includes a multichannel acoustic system (MAS) that is further augmented to provide enhanced auditory feedback representative of the various implementations disclosed herein.

The loudspeakers may be arranged in any of several different configuration such as the 7.1 surround sound system arrangement illustrated in FIG. 2 (as well as FIG. 3 and FIG. 4). Moreover, the plurality of microphones 202a-202g and the plurality of loudspeakers 204a-204h might be communicatively coupled to a centralized MAP located in a single location anywhere in the vehicle. Moreover, in alternative implementations, the MAP might instead be remotely located and connected by wireless means. Regardless, the MAP is operatively coupled to various inputs and produces enhanced outputs for an improved acoustic experience (such as enhanced clarity in speech that is heard, less irritation from superfluous background noises, etc.).

For certain implementations, the pairs of loudspeakers in each row (e.g., loudspeakers 204a and 204b in the first row 106a) may provide stereo output for a music player, and for certain other implementations the set of eight loudspeakers 204a-204h may operate together to provide the passengers with surround sound for music, movie soundtracks, or other surround sound media. Likewise, for certain implementations—and as shown in FIG. 2—more than one microphone may be provided for the driver, e.g., microphones 202a and 202g, and/or no microphone may be specifically provided for certain passengers, e.g., passenger 112c in seat 104d (a middle-row center-seat). Instead, this passenger 104d may utilize both microphones 202c and 202d where the MAS is able to use both of these microphones to uniquely detect and service all three seated positions in the second row 106b (and likewise for the other rows if they were to have a third middle seat).

In this manner, the MAP can act to balance sounds across the vehicle by taking sounds generated from any part of the vehicle—received as inputs at one or more of the microphones 202a-202g—and reproducing these sounds on a set or subset of loudspeakers 204a-204g in the other parts of the vehicle.

Likewise, FIG. 3 illustrates the shared acoustic space 100 of the automobile 102 of FIGS. 1 and 2 incorporating a multichannel acoustic system (MAS) but further enhanced and reconfigured to provide individual stereo sound to each of the passengers via twin loudspeakers 304a-304g at each seat as well as ceiling mounted microphones 302a-302g (with 302a being a dual-microphone for the driver's seat). For certain implementations, the pairs of loudspeakers for each seat (e.g., loudspeakers 304a-304g) to collectively or individually provide each passenger with stereo sound for music, movie soundtracks, or other media. In alternative implementations, additional loudspeakers for each seat (for example, six speakers total in a crescent arrangement) might instead be utilized to provide surround sound to each passenger collectively or individually. More specifically, as shown here in FIG. 3 (and also in FIG. 4), the twin loudspeakers 304a-304g at each seat (or a subset thereof) may instead be any increased number of speakers-such as, for example, six speakers arranged in a semi-circular fashion-to provide enhanced multidimensional sound.

In addition, image/video capture devices 322a-322d might also be incorporated and utilized to provide enhanced functionality and new features. Additionally, one or more video displays (not shown) might be integrated into the shared acoustic space—for example, one each in the dashboard (for the front seat passenger), in the back side of headrests of the first and second row seats (for the second and third row passengers), and/or drop down from the ceiling (for the center row middle passenger in particular)—to provide enhanced audio/visual functionality. Moreover, each seat might also be equipped with a tactile input device (not shown)—such as a keyboard, keypad, gamepad, trackball or touchpad, etc. —to enable the MAS to provide each passenger enhanced interaction with the features and capabilities across various media and senses. This interaction may also be provided via one or more of the video displays via a touchscreen interface.

Accordingly, navigation information might also be provided—for certain implementations—via a subset of loudspeakers from among the plurality of loudspeakers based on one of a plurality of different recipient configurations selectable by a driver, the different recipient configurations comprising a first recipient configuration for receipt of the navigation information by the driver only (and not the other passengers), a second recipient configuration for receipt of the navigation information by the driver and another front seat passenger only (and not the other passengers), and a third configuration for receipt of the navigation information by the driver and the set of other passengers. For the automobile illustrated in FIG. 3, for example, this can be accomplished by performing the navigation information only on the paired loudspeakers (e.g., 302a corresponding to the driver) for the intended recipients. A similar use of one or more of the loudspeakers 204a-204g in FIG. 2 can also be so utilized.

Moreover, for select implementations, the navigation information may be provided with a directional context such that navigation information corresponding to vehicle left is perceived by a recipient as coming from vehicle left, navigation information corresponding to vehicle right is perceived by a recipient as coming from vehicle right, navigation information corresponding to vehicle front is perceived by a recipient as coming from vehicle front, and navigation information corresponding to vehicle back is perceived by a recipient as coming from vehicle back.

Another feature provided by certain implementations is a conference call facility, provided by the MAS, that creates (for each passenger from among the plurality of passengers) a multi-dimensional acoustic perception of a plurality of distant participants. This effect may simulate, in an acoustic fashion, that each speaker is virtually seated around a table such that the passenger perceives sound coming from each different participant as coming from a unique direction relative to the passenger. Likewise, the conference call facility, utilizing the plurality of microphone, could also provide for the plurality of distant participants—or, more specifically, the subset of distant participants utilizing some form of stereo and/or surround sound—a similarly multi-dimensional acoustic perception of the plurality of passengers and can even extend this effect to include the other distant participants at different locations.

Moreover, when all of the passengers of a vehicle are identified and known, this information can also be used by the provided conference call facility. For example, if six people in the vehicle need to confer with a seventh person in another location by phone, the MAS can individually capture each person's speech and, based on their identity, virtually "arrange" each speaker in different surround sound configurations as perceived by the seventh person in the other location accordingly.

Yet another feature that may be provided by several implementations is noise cancellation for sound signals emanating from other sources (i.e., by other passengers) within the shared acoustic space. This noise cancellation or "masking" may be achieved utilizing known approaches for creating a diffused sound field. This kind of masking might also be used in conjunction with the echo cancellation and feedback cancellation features discussed further herein.

Select implementations of the MAS might also provide each passenger with a plurality of control features that are accessible, usable, and/or selectable by each passenger by any of several means including, for example, input on a personal communications device that is in communication with the MAS (via Bluetooth or other short distance wireless connectivity, for example.) Utilizing this feature, passengers can control music, temperature settings, etc., and use of a personal wireless communication device can eliminate the need for a built-in input device for each seat.

However, while these additional features and capabilities can provide an enhanced experience for passengers (including the driver), they can also lead to an increase in the degree and frequency of noise in the shared acoustic space of the automobile, further compromising the driver's auditory perception.

Indeed, in a more general sense, many tasks depend on the clear auditory perception of the participant to enhance performance and maintain safety. This may be especially true for tasks that require good auditory perception but must be performed in a shared acoustic space. For example, when driving an automobile it is desirable to listen for cues indicating danger (e.g., squealing wheels, blaring horn, etc.), urgency (e.g., sirens of emergency vehicles), and the unexpected (e.g., children behind a car in a driveway). However, it may be difficult for a driver to easily and clearly hear auditory cues because of other noise in the car. These interfering noises may include speech among other passengers, as well as other sources of noise common to a moving vehicle (e.g., engine noise, road noise, traffic noise, music, etc.). This can result in the driver relying more heavily on visual cues which, in turn, require the driver to take her eyes off of the road. Vision also suffers from physical limitations of the environment such as blind spots and the inability of the driver to rotate freely to maximize her field of view. Because vision is largely unidirectional and predominantly focused in the forward direction of an automobile in motion, vision is not an effective or desirable substitute for the 360 degrees of perception that hearing provides.

There are many situations when driving when compromised auditory perceptions can be problematic and/or dangerous. For example, a driver attempting to change lanes may not be aware of another vehicle in a blind spot and thereby obscured from view. Not only might the sound of that other vehicle not be evident to the driver attempting to change lanes, but the driver might not even hear a warning horn blast from the other vehicle that might otherwise prevent the driver from continuing the lane change (and striking the vehicle) if perceived by the driver.

Another example arises when a driver attempts to back a vehicle out of a driveway, parking space, etc. While the driver may have the benefit of certain technical aids—such as a backup rearview camera—the driver can only use this intermittently between also looking forward and backward through the windows to operate the vehicle. Moreover, even with a backup camera, the driver's view is still compromised by blind spots and movement into the path of the vehicle from the side (such as might result from a child chasing a ball).

Yet another common example is when a vehicle approaches an intersection and the driver—whose attention is focused forward—does not notice another vehicle approaching on the crossroad but is not decelerating to stop or yield the right-of-way and may in fact be accelerating (e.g., to run a red light, being unaware of the intersection, or perhaps being intoxicated). The driver, unaware of the approaching vehicle—and unable to hear the vehicle approach—is less able to avoid a collision (for which the driver would not be at fault).

For these reasons, several implementations disclosed herein also feature enhanced auditory feedback. These implementations use natural sound auditory cues directed at the driver and delivered in a stereo or surround sound context to communicate information (including nature of and relative direction) useful to the driver and in a manner natural for the driver to utilize. Several such implementations are directed to the use of a multichannel acoustic system (MAS) comprising an arrangement of microphones, loudspeakers, filters, and a multichannel acoustic processor (MAP) to enhance the general auditory experience for all passengers in shared acoustic space, and many such implementations are specifically directed to the integration of such a system into the shared acoustic space of an automobile. Other implementations are directed to the integration of MAS into other forms of transportation (e.g., planes, trains, motorcycles, boats, etc.) while still providing enhanced auditory feedback to persons that can benefit from it. Yet other implementations are directed to non-transportation shared acoustic spaces such as theaters, conference rooms, presentation halls, and any other location where a public address system might be utilized but where a subset of individuals could benefit from enhanced auditory feedback.

To counteract the difficulties presented by these exemplary scenarios, the same enhancements that may be aggravating the noise problem can also be utilized by the various implementations disclosed herein. In other words, by leveraging the capabilities of the MAS represented in FIG. 2 or the reconfigured MAS represented in FIG. 3, a targeted individual in a shared acoustic space—such as in the exemplary context of a driver in an automobile—can be provided with enhanced auditory feedback to increase safety and driving performance.

FIG. 4 illustrates the automobile 102 of FIG. 3 that includes a multichannel acoustic system (MAS) that is further augmented to provide enhanced auditory feedback representative of the various implementations disclosed herein. In FIG. 4, a plurality of external sensors 462a-462d are incorporated into the MAS to provide external detection capabilities 360-degrees around the vehicle 102. These external sensors may provide a variety of detection capabilities including, for example, Doppler-based ultra sensing, multi-microphone direction-of-arrival (DoA) sensing, imaging-based detection approaches, or a combination of two or more of such known methodologies. Based on the external detection, the MAS can provide a sound signal cue to the driver, e.g., using the entire loudspeaker configuration to be discernable to all passengers, just the loudspeakers necessary to be discernable by the driver, or just the driver's personal loudspeakers and thus only discernable to the driver, as well as convey the relative direction of the object or event that was sensed by the sensors (hereinafter the "hazard") using the stereo or surround sound features of the MAS to convey that sound signal cue to the driver.

For various implementations, the sound signal cue provided by the MAS to the driver might match a natural sound corresponding to the hazard to which it pertains. In the context of a vehicle in the blind spot of a lane that the driver might try to change into (perhaps indicating so by turning on the turn signal or indicator), the sound signal cue might be a noise recognizable as a large vehicle in motion akin to how an actual large vehicle might sound to the driver through an open window albeit appropriately amplified to overcome the ambient noise of the shared acoustic space in the automobile and perceived by the driver to be coming from the same direction as the other vehicle occupies relative to the driver. Similarly, in the context of a child or animal entering the rearward path of a backing vehicle, the sound signal cue might be child or dog noises from the appropriate direction accordingly, again amplified for the driver above the general din. Likewise, for a vehicle approach from a crossroad and speeding through an intersection, the sound signal cue might be loud vehicle noise the driver perceives to be emanating from the direction of the other vehicle. With regard to this third example, however, the sound might be more contrived to match the relative peril, e.g., a siren for an emergency vehicle (even though the other vehicle is not one). Regardless of the peril, however, the system would produce an appropriately recognizable sound to invoke a natural but beneficial reaction from the driver, and this sound would be produced even if the hazard does not actually produce any sound (i.e., the child is not yelling, the dog is not barking, the blind-spot vehicle is actually a quiet electric vehicle, etc.).

Figure 5:
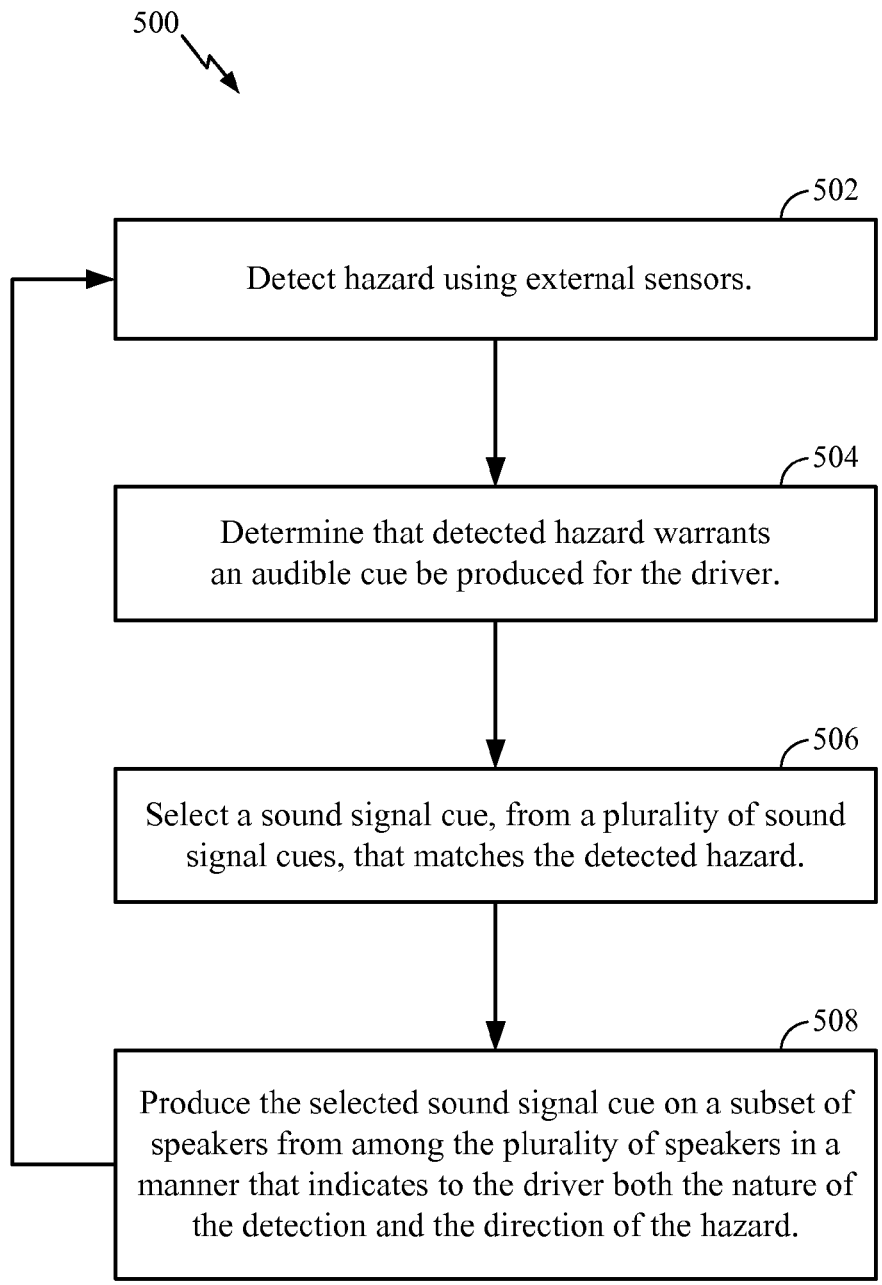
FIG. 5 is a process flow diagram for a method of enhanced auditory feedback representative of various implementations disclosed herein.

FIG. 5 is a process flow diagram 500 for a method of enhanced auditory feedback representative of various implementations disclosed herein. Commencing at 502, the MAS, using the external sensors, may detect a hazard. At 504, the MAS may determine that the detected hazard warrants an audible cue be produced for the driver. At 506, a sound signal cue that matches the detected hazard is selected from a plurality of sound signal cues and, at 508, this sound signal cue is produced on a subset of speakers from among the plurality of speakers in the automobile in a manner that indicates to the driver both the nature of the detection and the direction of the hazard. The process returns to 502 for the next hazard detection.

For certain implementations, the enhanced auditory feedback system may also comprise an interface by which the driver can personalize which sound signal cues are played for specific hazards, as well as set various parameters of sensitivity for when the driver would like to receive a sound signal cue. Furthermore, the sound signal cue might be produced so that all passengers can hear it, so that a select subset of passengers can hear it, or so that only the driver can hear it. The specific sound signals and who might hear them can also be determined by the identity of the driver and other passengers that may be determined by the MAS as described further herein.

Moreover, although several exemplary implementations have been described in the context of an automobile, these implementations also encompass a variety of other shared acoustic spaces where a specific individual might benefit from enhanced auditory feedback. For example, the driver of a tank or the pilot of a fighter aircraft might benefit from sound signal cues instead of or in addition to visual cues they might already utilize. Various watercraft such as boats and jet skis could also benefit, as could other modes of transportation such as a motorcycle that, although perhaps not suffering from noise generated by other passengers in a shared acoustic space, is even more affected by wind and road noise and could benefit from enhanced auditory feedback that the various implementations disclosed herein provide.

In the context of a shared acoustic space, however, it should also be noted that the use of multiple microphones with multiple loudspeakers can lead to the undesired effects of echo and feedback, especially for sound signal cues that are played from multiple loudspeakers and detectable by one or more far microphones. Thus, there is a need to address echo and feedback that can result from operation of a MAS.

In general, echo (also known as "Surround Sound Echo") results from any condition by which a specific sound emitting from different loudspeakers travels different paths and reaches a listener at different times, thereby creating a duplicative, repeating, or fuzzy sound effect. For a multi-loudspeaker system, each loudspeaker effectively contributes to echo effect because the sound produced by each loudspeaker will, to some extent, travel a unique acoustic path before reaching the ear of the listener. Moreover, although microphones are not required for an echo effect to occur, for the various implementations disclosed herein that employ multiple microphones, these various microphones may partially detect these sounds and reproduce them at one or more loudspeakers in a manner that further enhance the echo effect (distinct and separate from any feedback effects discussed later herein).

To compensate for the echo effect, and for certain implementations herein disclosed, one approach is for the MAS to actively learn the acoustic paths from each of the loudspeakers with respect to a specific target listening location found within the acoustic space. This active approach may comprise a calibration mode that produces one or more test sounds at each loudspeaker individually, measures these sounds using one or more microphones, and determines the learned acoustic path for each such loudspeaker with respect to the target listening location. The MAS can then create a mono-far-end reference signal by mixing the individual test sound signals using the learned acoustic paths. This mono-far-end reference signal can be used to cancel the echo by appropriately modifying (delaying, quieting, etc.) the sound signals produced by each loudspeaker to effectively cancel the echo.

Additionally, because of the finite configurations of between one and seven persons in a seven seat environment, for example, it is possible that the echo effect differs based on each different configuration of people. Accordingly, for select implementation the MAS may learn various echo cancellations schemes, one for each configuration, and then deploy a previously learned echo cancellation scheme when the particular configuration for which it was determined again occurs using active or passive configuration determination techniques discussed later herein.

Furthermore, for select implementations, echo effect calibrations may also be made for each configuration based on different target listening locations that could correspond to a specific favored target seat locations (e.g., the driver's seat) or a target location that favors a subset of specific seat locations (e.g., between the driver's seat and the front row passenger's seat) which are automatically selected based on various criteria (e.g., when the corresponding seat(s) are occupied) or, for specific implementations, might be directly selectable by a driver or a passenger accordingly. And for some implementations, a specific configuration may be selected based on the specific identities of one or more passengers (e.g., the vehicle owner or a "VIP passenger") based on their location within the vehicle, the identities being automatically determined by the system using active or passive identification determination techniques discussed later herein.

Feedback (or "acoustic positive feedback") occurs when a sound loop exists between an audio input (e.g., a microphone) and an audio output (e.g., a loudspeaker). For example, a signal received by a microphone may be amplified and passed out of a loudspeaker. The sound from the loudspeaker can then be received by the microphone again, amplified further, and then passed out through the loudspeaker again. The frequency of the resulting sound is determined by resonance frequencies in the microphone, amplifier, and loudspeaker, the acoustics of the room, the directional pick-up and emission patterns of the microphone and loudspeaker, and the distance between them. For small public address (PA) systems, the sound is readily recognized as a loud squeal, screech, or howling sound.

One approach for reducing feedback is the selective input technique which utilizes low sensitivity directional microphones that can only pick up sounds within a limited range (and ideally a range less than the distance to any loudspeakers). This solution may be useful for shared acoustic spaces where the microphones utilized are those provided by, for example, personal communication devices which are designed to operate close to a person's mouth (or when speech originates in much closer proximity than sounds produced by a loudspeaker).

When the difference in distance between person-and-microphone versus loudspeaker-and-microphone is not significant—which is often the case for relatively confined shared acoustic spaces and/or microphones that are not used close to the mouth (such as those built into automobiles as shown in FIG. 2)—a more effective approach for reducing feedback is selective reproduction in which sounds are not reproduced by a loudspeaker when received at a nearby microphone (or nearby microphones). For example, for loudspeaker 204a of FIG. 2, sound that is received by near microphones 202a and/or 202g might not be reproduced on this loudspeaker 204a, thereby reducing possible feedback; however, sounds from the loudspeaker 204a may still be received at far microphone 202e which might still be reproduced on loudspeaker 204a causing feedback.

An alternative approach for reducing feedback on a loudspeaker (e.g., loudspeaker 204a) resulting from a far microphone (e.g., microphone 202e) that might still detect sounds (particularly loud sounds) produced by the subject loudspeaker 204a—and which can be used alone or in conjunction with the selective input approach described in the previous paragraph—is the crosstalk cancellation technique. Crosstalk cancellation uses a microphone near the loudspeaker (e.g., microphone 202a) to collect a reference sound output for the loudspeaker (comprising loudspeaker 204a produced sound signals as well as any other sounds detectable by the near microphone 202a) that can then be used to proactively determine and filter out the same sound output of (and to the extent detected by) the far microphone 202e which might otherwise be directed to and reproduced on the loudspeaker 204a.

The reference sound output collected by the near microphone 202a for the loudspeaker 204a is the same output that is automatically precluded from being directly reproduced by the loudspeaker 204a in the selective reproduction technique described above.

Figure 6:
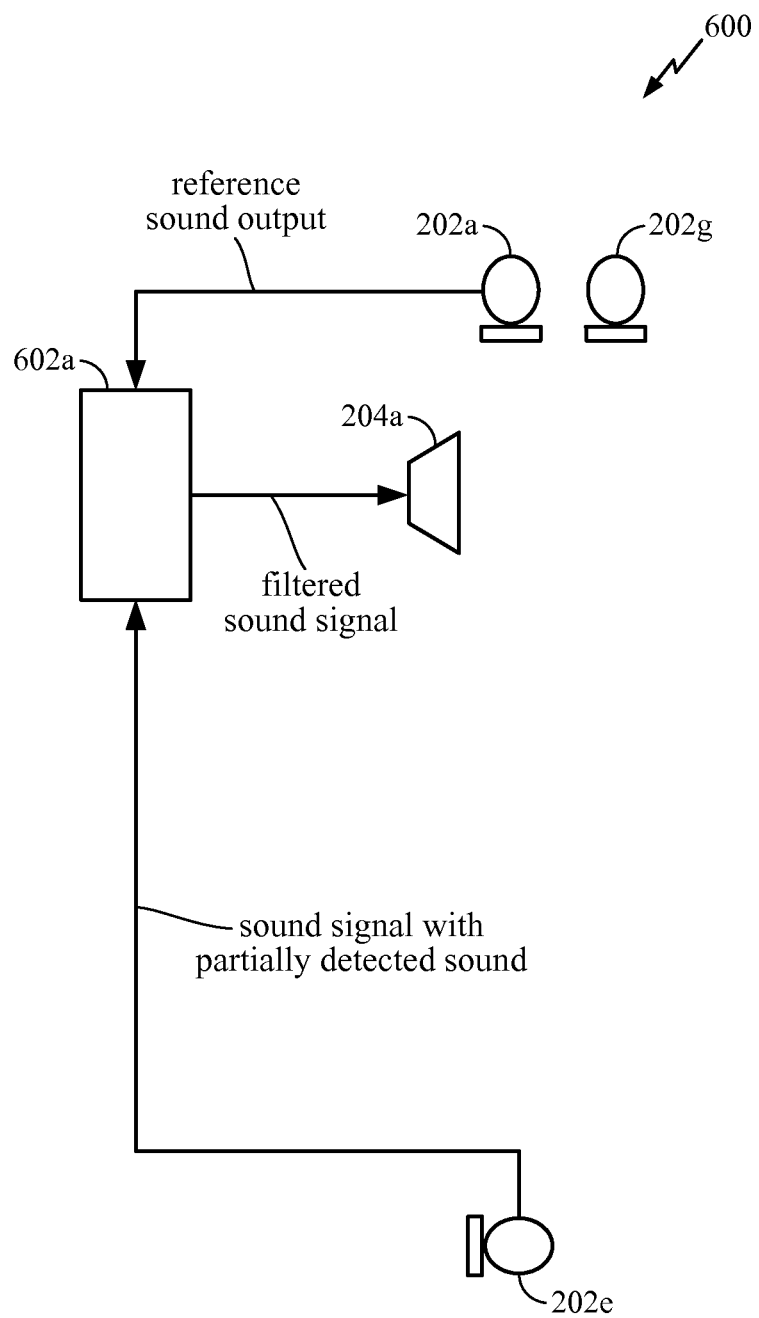
FIG. 6 is a block diagram illustrating system components to perform a half-duplex crosstalk cancellation technique representative of and utilized by the various implementations disclosed herein.

FIG. 6 is a block diagram 600 illustrating system components to perform the crosstalk cancellation technique representative of and utilized by the various implementations disclosed herein. In FIG. 6 (and in reference to FIGS. 1 and 2), a loudspeaker 204a produces a sound signal which is detected by near microphone 202a to produce a reference sound output that is sent to adaptive filter 602a. The sound signal is also detected, at least partially, by far microphone 202e and this partially detected sound would normally be sent (along with local sounds also detected by the microphone 202e) to the loudspeaker 204a and reproduced (leading to feedback). However, the adaptive filter 602a, using the reference sound output detected by near microphone 202a, filters out the partially detected sound so that only the local sounds detected by the far microphone 202e are reproduced on the loudspeaker 204a.

The crosstalk cancellation illustrated in FIG. 6 is half-duplex (operating in only one direction) but can be readily extended to full-duplex for a two-way conversation between two persons near each microphone respectively. Moreover, for a shared acoustic space with multiple microphones and multiple loudspeakers, similar full-duplex crosstalk cancellation configurations can be formed for each combination of a loudspeaker, near microphone, and far microphone.

Figure 7:
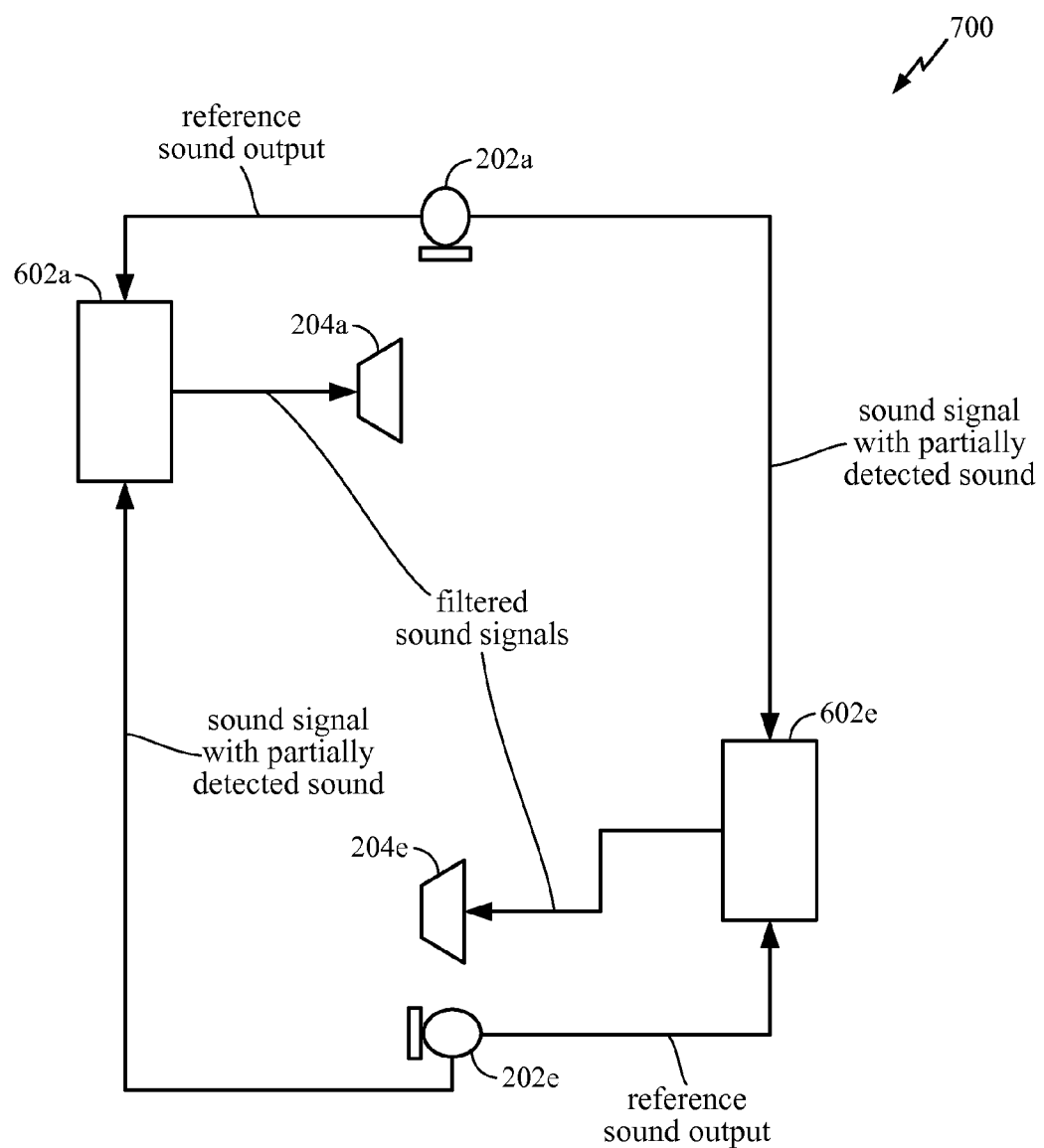
FIG. 7 is a block diagram illustrating system components to perform a full-duplex crosstalk cancellation technique representative of and utilized by the various implementations disclosed herein.

FIG. 7 is a block diagram illustrating system components that perform a full-duplex crosstalk cancellation technique representative of and utilized by the various implementations disclosed herein. As in FIG. 6, here in FIG. 7 (and again in reference to FIGS. 1 and 2) a loudspeaker 204a produces a sound signal which is detected by the near microphone 202a to produce a reference sound output that is sent to the adaptive filter 602a. The sound signal is also detected, at least partially, by the far microphone 202e and is sent to the adaptive filter 602a which, using the reference sound output detected by the near microphone 202a, filters out the partially detected sound so that only the local sounds detected by the far microphone 202e are reproduced on the loudspeaker 204a. In addition, a loudspeaker 204e produces a separate sound signal which is detected by the near microphone 202e to produce a separate reference sound output that is sent to the adaptive filter 602e. This separate sound signal is also detected, at least partially, by the far microphone 202a and sent to the adaptive filter 602e which, using the reference sound output, then filters out the partially detected sound so that only the local sounds detected by the far microphone 202a are reproduced on the loudspeaker 204e.

Figure 8:
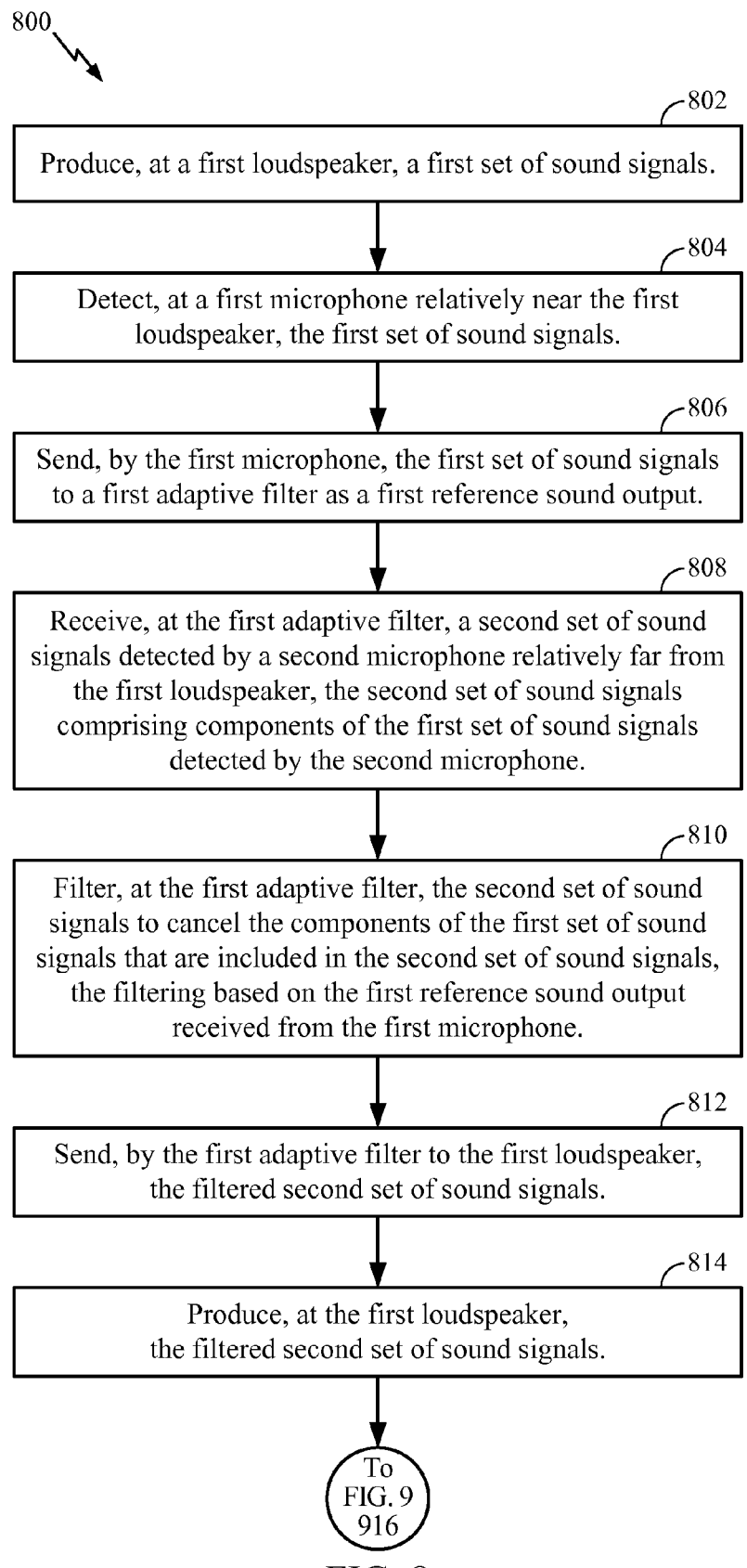
FIG. 8 is a process flow diagram for a method of performing crosstalk cancellation in a shared acoustic space for a MAS representative of various implementations disclosed herein.

FIG. 8 is a process flow diagram 800 for a method of performing crosstalk cancellation in a shared acoustic space for a MAS representative of various implementations disclosed herein. In FIG. 8, the MAS produces, at a first loudspeaker, a first set of sound signals at 802. At 804, the MAS detects, at a first microphone relatively near the first loudspeaker, the first set of sound signals. At 806, the MAS sends, by the first microphone, the first set of sound signals to a first adaptive filter as a first reference sound output. At 808, the MAS receives, at the first adaptive filter, a second set of sound signals detected by a second microphone relatively far from the first loudspeaker, the second set of sound signals comprising components of the first set of sound signals detected by the second microphone. At 810, the MAS filters, at the first adaptive filter, the second set of sound signals to cancel the components of the first set of sound signals that are included in the second set of sound signals, the filtering being based on the first reference sound output received from the first microphone. At 812, the MAS sends, by the first adaptive filter to the first loudspeaker, the filtered second set of sound signals. At 814, the MAS produces, at the first loudspeaker, the filtered second set of sound signals.

Figure 9:
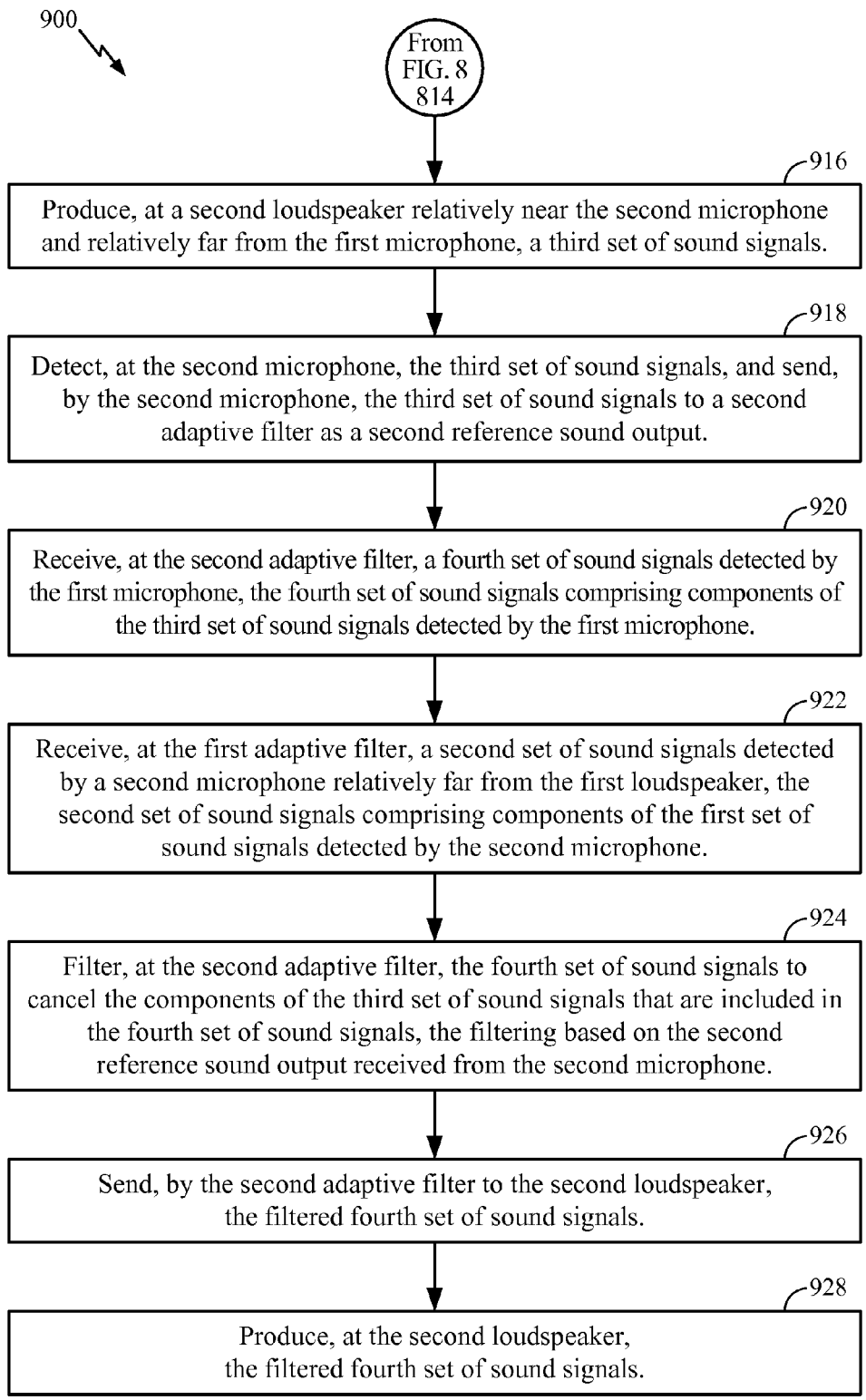
FIG. 9 is a process flow diagram for extending the half-duplex processing illustrated in FIG. 8 to full-duplex processing representative of various implementations disclosed herein.

FIG. 9 is a process flow diagram 900 for extending the half-duplex processing illustrated in FIG. 8 to full-duplex processing representative of various implementations disclosed herein. In FIG. 9—and continuing from the end of the process flow in FIG. 8—at 916, the MAS produces, at a second loudspeaker relatively near the second microphone and relatively far from the first microphone, a third set of sound signals. At 918, the MAS detects, at the second microphone, the third set of sound signals, and at 920, the MAS sends, by the second microphone, the third set of sound signals to a second adaptive filter as a second reference sound output. At 922, the MAS receives, at the second adaptive filter, a fourth set of sound signals detected by the first microphone, the fourth set of sound signals comprising components of the third set of sound signals detected by the first microphone. The MAS filters, at the second adaptive filter, the fourth set of sound signals to cancel the components of the third set of sound signals that are included in the fourth set of sound signals at 924, the filtering being based on the second reference sound output received from the second microphone. At 926, the MAS sends, by the second adaptive filter to the second loudspeaker, the filtered fourth set of sound signals. At 928, the MAS produces, at the second loudspeaker, the filtered fourth set of sound signals.

For several implementations, the adaptive filter may only operate to filter the reference sound output out of the corresponding received sound signals when the reference sound input is loud and the sound signals are soft (not loud). For example, for certain implementations, the adaptable filter may quantify the acoustic transfer function of the reference sound input, quantify the acoustic transfer function of the sound signals and, if the ratio of the former to the latter exceeds a predetermined threshold, only then filter the sound signal based on the reference sound input. For other implementations, the aforementioned ratio might instead be used to perform partial filtering proportional to the ratio determined. In yet other implementations, filtering might also only be applied (by any technique including the two previously described) when the acoustic transfer function of the reference sound input exceeds a predefined maximum threshold for "loud," when the acoustic transfer function sound signals exceeds a predefined minimum threshold for "soft," or both.

Incorporating echo cancellation and feedback cancellation into various implementations of the MAS disclosed herein enables the speech in one part of a shared acoustic space to be reproduced in another, separate part of the shared acoustic space.

Figure 10:
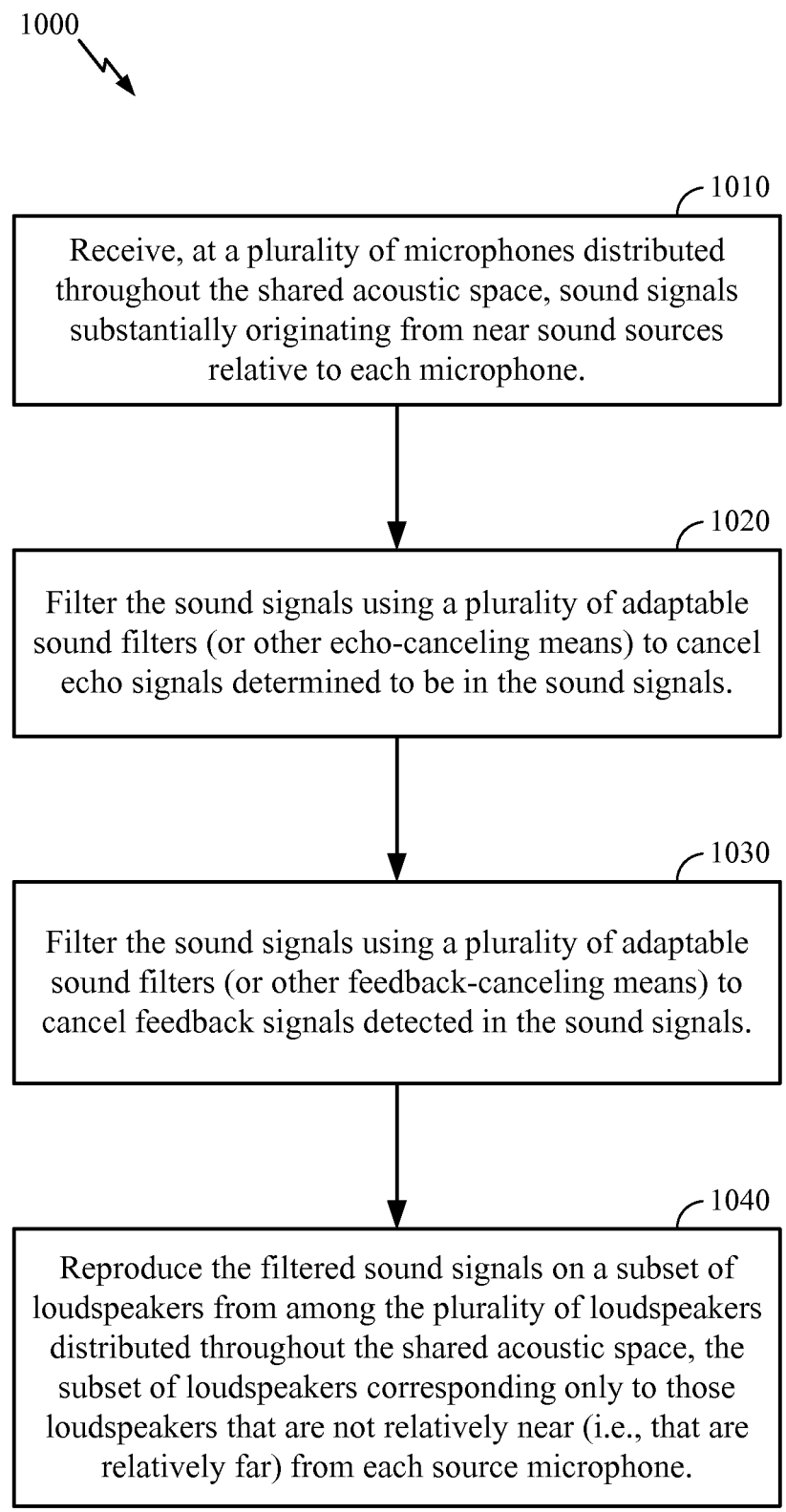
FIG. 10 is a process flow diagram for a method for enhancing conversational speech in a shared acoustic space performed by a multichannel acoustic system comprising a plurality of microphones, a plurality of loudspeakers, and a plurality of echo canceling and feedback canceling filters, and representative of several implementations disclosed herein.

FIG. 10 is a process flow diagram 1000 for a method for enhancing conversational speech in a shared acoustic space—such as the shared acoustic space 100 of the automobile 102 illustrated in FIGS. 1 and 2—by a multichannel acoustic system comprising a plurality of microphones, a plurality of loudspeakers, and a plurality of echo canceling and feedback canceling filters representative of several implementations disclosed herein. In FIG. 10, the method commences at 1010 with receiving, at the plurality of microphones distributed throughout the shared acoustic space, sound signals substantially originating from near sound sources relative to each microphone. At 1020, the sound signals are filtered, using a plurality of adaptable sound filters (or other echo-canceling means), to cancel echo signals determined to be in the sound signals. At 1030, the sound signals are further filtered, using a plurality of adaptable sound filters (or other feedback-canceling means), to cancel feedback signals detected in the sound signals. At 1040, the filtered sound signals are reproduced on a subset of loudspeakers from among the plurality of loudspeakers distributed throughout the shared acoustic space, the subset of loudspeakers corresponding only to those loudspeakers that are not relatively near (i.e., that are relative far) from each source microphone.

Thus, in view of FIG. 10 and the other disclosures set forth herein, various implementations may be directed to enhancing an auditory experience in a shared acoustic space using a multichannel acoustic system comprising a plurality of microphones, a plurality of loudspeakers, a plurality of filters, a multichannel acoustic processor, and a mobile communications interface, the shared acoustic space having a plurality of zones, each zone corresponding to each microphone from among the plurality of microphone and each loudspeaker from among the plurality of loudspeakers, the method comprising: receiving, at the plurality of microphones distributed throughout the shared acoustic space, sound signals substantially originating from the plurality of zones; echo filtering and feedback filtering, at a plurality of adaptable sound filters, the sound signals received at each microphone in each zone to cancel at least one echo signal and at least one feedback signal; and reproducing filtered sound signals on the plurality of loudspeakers in the plurality of zones except for the zone in which the filtered sound signal originated. For certain implementations, the shared acoustic space may be an interior passenger compartment of a vehicle for utilization by a plurality of passengers comprising a driver and a set of other passengers, wherein the plurality of loudspeakers and the plurality of microphones are distributed throughout the shared acoustic space in relation to the passenger seats of the vehicle.

Furthermore, several implementations may further provide, for at least one zone from among the plurality of zones, an interface with at least one portable device located in that zone to operationally couple the portable device to at least one microphone in that zone, to at least one loudspeaker in that zone, or both in order to provide the user of the portable device located in that zone with a personalized audio experience. Certain such implementation may further provide, for each zone from among the plurality of zones, an interface capable of operationally coupling a portable device located in each such zone. Select implementations may also provide that, for each zone from among the plurality of zones, the interface capable of operationally coupling a portable device located in each such zone operates in parallel with the other interfaces.

Moreover, other implementations may further comprise: providing, by the multichannel acoustic system, a conference call facility that creates, for each passenger from among the plurality of passengers, a multi-dimensional acoustic perception of a plurality of distant participants; and providing, for the plurality of distant participants, a multi-dimensional acoustic perception of the plurality of passengers; wherein the conference call facility is provided by a mobile communications device operationally coupled to the multichannel acoustic system via the mobile communications interface. For certain such implementations, navigation information may also be provided by the multichannel acoustic system to the driver, the navigation information comprising a directional context such that navigation information corresponding to vehicle left is perceived by a recipient as coming from vehicle left, navigation information corresponding to vehicle right is perceived by a recipient as coming from vehicle right, navigation information corresponding to vehicle front is perceived by a recipient as coming from vehicle front, and navigation information corresponding to vehicle back is perceived by a recipient as coming from vehicle back.

Figure 11:
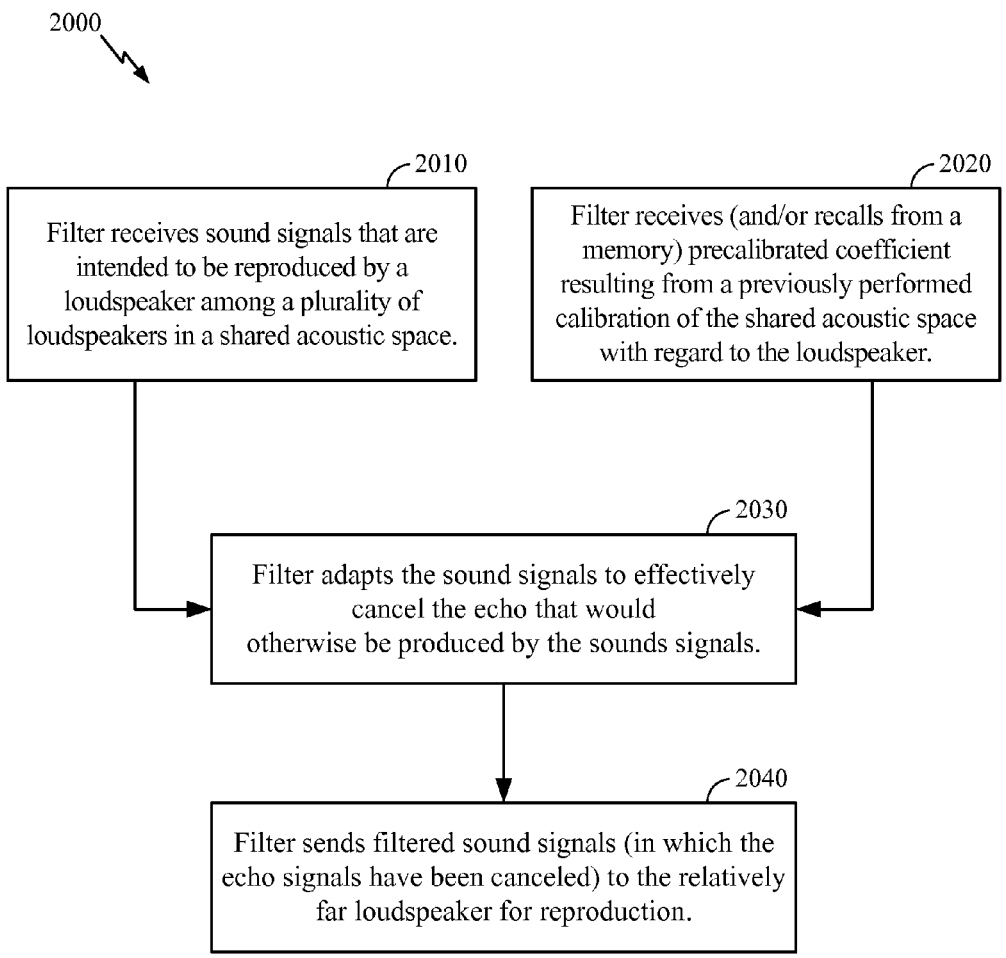
FIG. 11 is a process flow diagram, representative of implementations herein disclosed, for a method of filtering or canceling echo signals—at, for example, an adaptable sound filter—that would otherwise be produced by a plurality of loudspeakers in a shared acoustic space.

FIG. 11 is a process flow diagram 2000, representative of implementations herein disclosed, for a method of filtering or canceling echo signals—at, for example, an adaptable sound filter—that would otherwise be produced by a plurality of loudspeakers in a shared acoustic space. In FIG. 11, at 2010 the filter receives sound signals that are intended to be reproduced by a loudspeaker among a plurality of loudspeakers in a shared acoustic space. Separately, at 2020, the same filter receives (and/or recalls from a memory) pre-calibrated coefficient resulting from a previously performed calibration of the shared acoustic space with regard to the loudspeaker. At 2030, the filter adapts the sound signals to effectively cancel the echo that would otherwise be produced by the sound signals. At 2040, the filtered sound signals (in which the echo signals have been canceled) are sent to the loudspeaker for reproduction.

Figure 12:
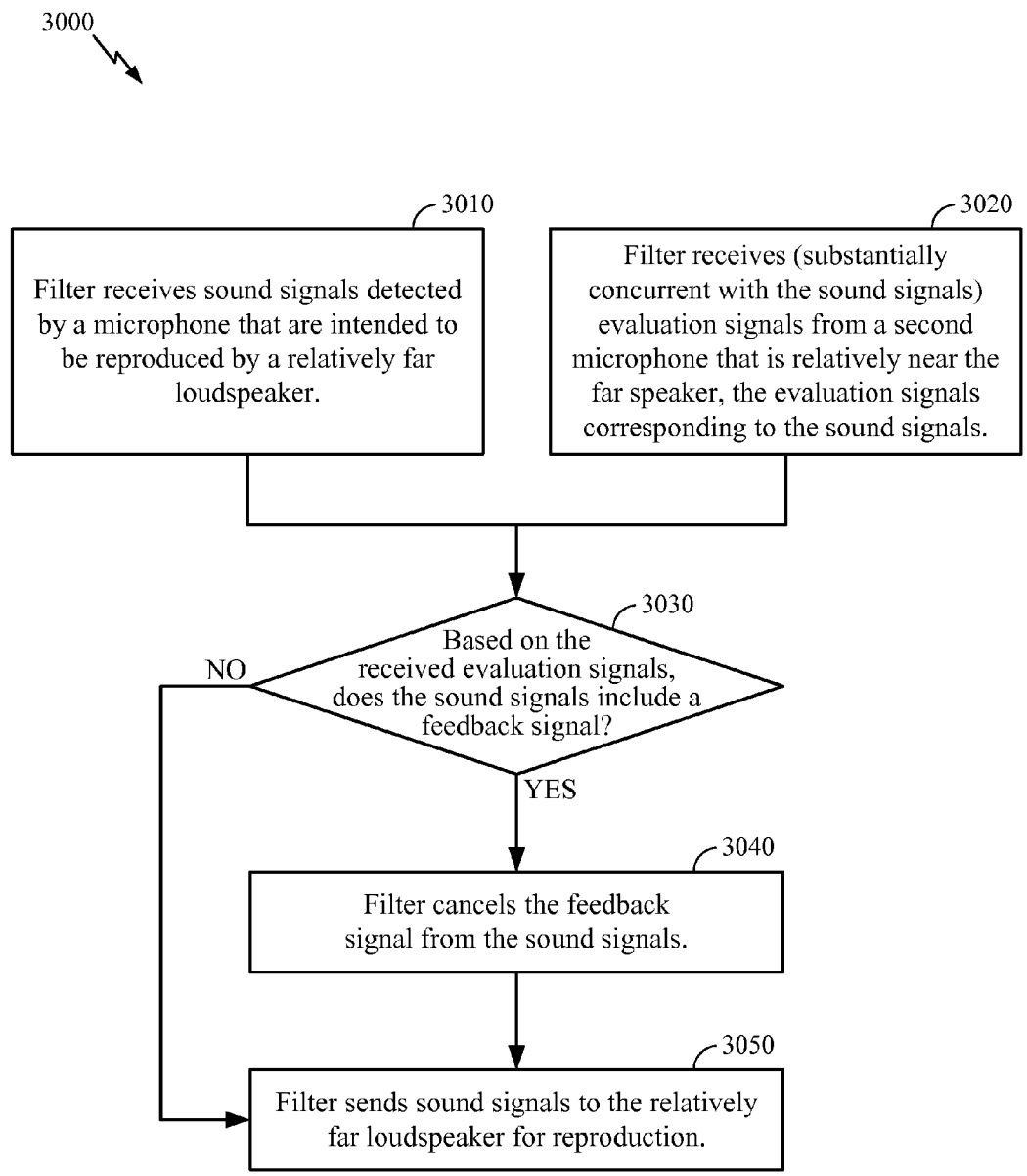
FIG. 12 is a process flow diagram representative of implementations herein disclosed, for a method of filtering or canceling feedback signals—at, for example, an adaptable sound filter—from sound signals received from a microphone in a shared acoustic space that are to be reproduced by a far loudspeaker in the same shared acoustic space.

FIG. 12 is a process flow diagram 3000, representative of implementations herein disclosed, for a method of filtering or canceling feedback signals—at, for example, an adaptable sound filter—from sound signals received from a microphone in a shared acoustic space that are to be reproduced by a far loudspeaker in the same shared acoustic space. In FIG. 12, at 3010 the filter receives sound signals detected by a microphone that are intended to be reproduced by a relatively far loudspeaker. Separately, at 3020 the same filter receives (substantially concurrent with the sound signals) evaluation signals from a second microphone that is relatively near the far speaker, the evaluation signals corresponding to the sound signals. At 3030, the filter determines, based on the received evaluation signals, whether the sound signals include a feedback signal. If so, then at 3040 the filter cancels the feedback signal from the sound signals and, at 3050, the filtered sound signals are sent to the relatively far loudspeaker for reproduction. If not, then the sound signals are sent to the relatively far loudspeaker for reproduction as received by the filter (i.e., unfiltered).

With regard to FIGS. 10, 11, and 12, the term "filter" may be a single filter capable of performing both echo cancellation and feedback cancellation, and the capabilities of such a filter may include processing capabilities provided by the multichannel acoustic processor and/or other components.

With regard to active or passive configuration determinations, the various implementations disclosed herein—and discussed in the context of the automobile 102 of FIGS. 1 and 2 for convenience—may be configured to use any of several means for determining a current configuration of passengers in a shared acoustic space. For example, for certain implementations, the MAS may determine a current configuration of passengers by monitoring sounds emanating from the specific seat locations of the vehicle to determine which seats are occupied and which seats are not. Image or video capture devices incorporated into the shared acoustic space might also be utilized to determine which seats are occupied and which seats are not. Likewise, other detection means—such as weight sensors integrated into the seat bottoms such as or akin to those already used in front passenger seats to detect whether to disable an airbag to protect a child passenger—can also be utilized. And a combination of these and other methods may be used to actively or passively determine which seats are occupied and which seats are not, and thereby enable the MAS to determine—on the basis of occupied seats—the current configuration of passengers and, based on this specific configuration, perform echo cancellation, feedback cancellation, and a variety of other functions pertaining to that particular configuration.

In addition to the foregoing, certain implementations may make use of active or passive identification determination techniques. The active or passive identification determinations—as applied to the various implementations disclosed in the present application—are summarized as follows.

Active or passive identification determinations—and again discussed in the context of the automobile 102 of FIGS. 1 and 2 for convenience—may be configured to use any of several means for determining the specific identity of passengers in each occupied seat of a shared acoustic space. For example, for certain implementations the MAS may determine the specific identity of passengers by monitoring speech sounds emanating from each seat where the differences in speech from person to person is the basis for uniquely identifying each passenger. Image or video capture devices incorporated into the shared acoustic space and that utilize facial recognition software or some similar techniques might also be utilized to uniquely identify passengers in the occupied seats. Likewise, other detection techniques—even less precise sensors such as weight sensors integrated into the seat bottoms such as or akin to those already used in front passenger seats to detect whether to disable an airbag to protect a child passenger—can also be utilized to broadly distinguish between different passengers when the potential passengers are sufficiently small in number and diverse in measure to enable unique identification. A combination of these and other methods may be used to actively or passively determine with greater accuracy the specific unique identify of the passenger in each occupied seat.

In this manner, not only does uniquely identifying each passenger also provide a broad determination of the configuration of the passengers on an occupied-seat basis (akin to the more general configuration determinations described above) but it also enables an additional level of specificity for personalized configuration determinations that, in addition to being based on which seats are occupied, is further refined based on which seats are occupied by specific known individuals. This, in turn, allows for distinctions for the specific four-person-based seating configuration reflected in FIGS. 1 and 2—which is one configuration among many possible based on which seats are occupied—with the additional dimension based on who is seating in each of those occupied seats. For the specific four-person-based seating configuration reflected in FIGS. 1 and 2, this additional dimension based on identity is essentially limitless (i.e., the entire human race of identities); however, since most personal vehicles often transport people from a much smaller subset of individuals, the actual number of additional configurations possible taking into account an identity dimension is larger than configurations that do not account for passenger identity but is still relatively finite (and can be made even more finite by introducing filters such as only accounting for passengers that have occupied a seat for a minimum number of trips, or minimum number of trips within a specific window of time, etc.).

As used herein, references to "passive" determinations (of occupied-seat configurations and/or passenger identities) are those performed by the MAS through normal and typical operation of its functions without direct user input from passengers, whereas "active" determinations are those which also incorporate a user or passenger provided direct or intentional user input—such as speaking their own name, providing an access code, or indicating a preference or selecting a particular configuration, setting, etc. However, these distinctions are not intended to detract from or limit the inventive concepts disclosed herein, and thus any interpretation of "passive" as used herein includes "active" equivalents and vice versa.

Figure 13:
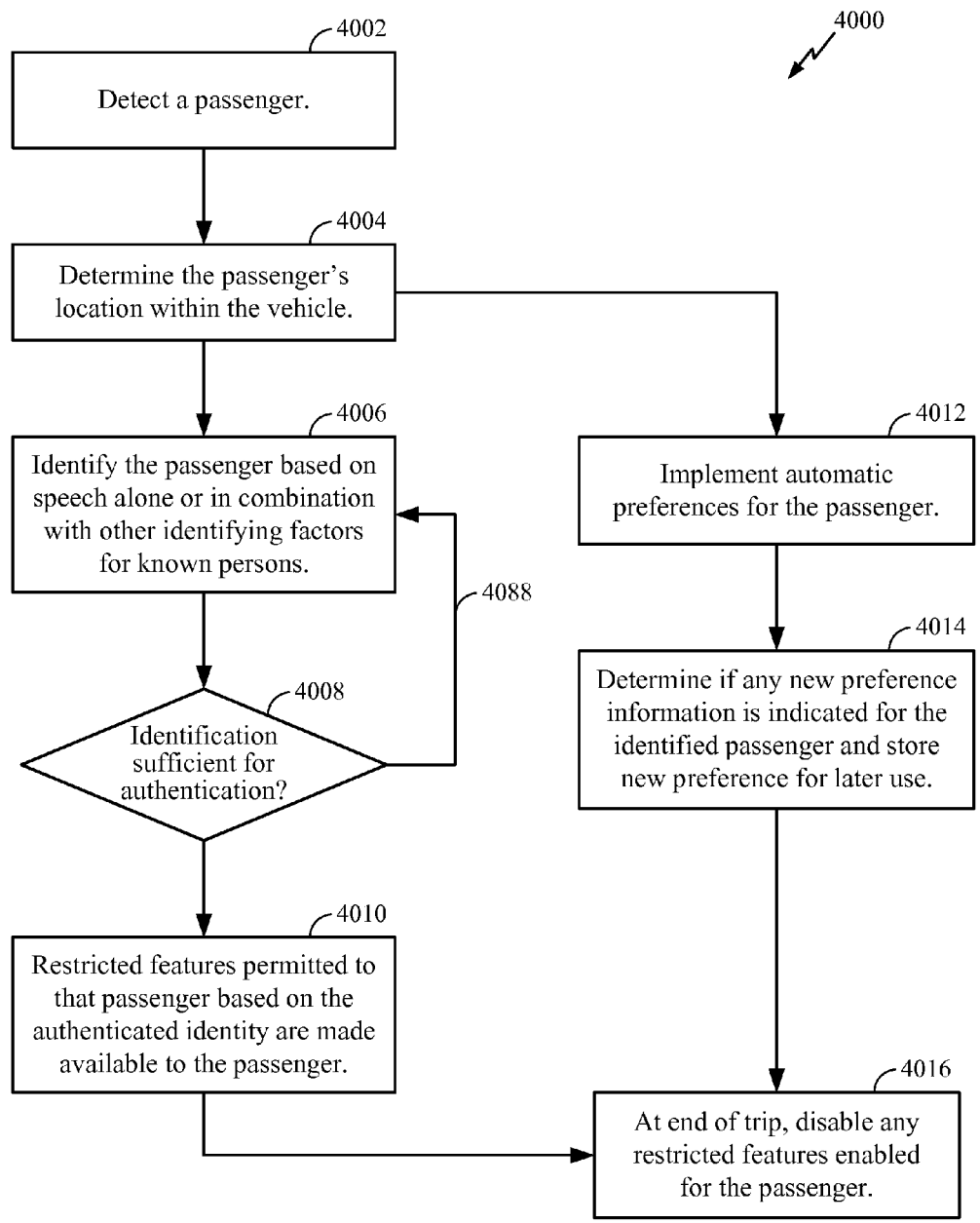
FIG. 13 is a process flow diagram for an exemplary method of identifying and authenticating a passenger by various implementations of the MAS to provide personalized and customized service representative of various implementations disclosed herein.

FIG. 13 is a process flow diagram 4000 for an exemplary method of identifying and authenticating a passenger by various implementations of the MAS to provide personalized and customized service representative of various implementations disclosed herein. The method starts at 4002 when the MAS detects a passenger (or possible passenger, such as in the case of an automobile door being opened) and the position within the vehicle for that passenger. At 4004, the MAS determines the passenger's location within the vehicle. At 4006, the MAS identifies the passenger based on speech alone or in combination with other identifying factors for known persons. At 4008, the MAS determines if the identification is sufficiently certain to constitute authentication and, if so, then at 4010 the restricted features permitted to that passenger based on their authenticated identity are then made available to the passenger. If the passenger's identity cannot be sufficiently ascertained to provide authentication, this process may repeat iteratively (as shown by loopback 4088) until there is sufficient confidence in the identification to warrant authentication. Meanwhile, at 4012 the MAS might also concurrently implement any automatic preferences for the passenger such as seat position, music preference, and temperature settings. At 4014, the MAS determines—during the course of the trip—if any new preference information is indicated for the identified passenger (such as, for example, the identified passenger moving the seat into a different configuration or changing radio station) and stores this new preference information for later use. When the trip is over and the passenger leaves the vehicle, at 4016 the MAS may disable any features reserved or restricted to the benefit of said passenger and return to the detection step at 4002. This cycle can be run in several separate but concurrent iterations for each position (i.e., seat) in the vehicle.

For example, a passenger in the driver seat (i.e., a vehicle driver) may be identified based on their speech alone or by speech coupled with facial recognition or iris recognition (via the camera(s)) and/or a variety of other identifying technique such as fingerprint (via a sensor at the door handle, steering wheel, gear shift, set belt, or any other service likely to be touched by a driver), or seated body weight (for vehicles likely to have only a limited population of potential drivers where this measure can distinguish one person from another). In contrast to a password or code spoken by the driver to self-identify—which could be easily compromised by anyone within hearing distance such as another passenger—these automated means for identification cannot be easily circumvented or spoofed which, in turn, enables authentication (e.g., multi-modal factor authentication) of the specific user/passenger for access to restricted features, functionality, information, etc.

Simple identification of a passenger (including the driver) may be sufficient to provide basic services such as custom set settings, preferred music playback, personal climate control settings, and a variety of other services. However, more secure authentication (e.g., multi-modal factor authentication) can also provide safety in several ways such as, for example, preventing an identified person known to be unlicensed (perhaps due to age) from being able to start the vehicle or take it out of parked or braked condition; restricting access to personal communications such as email or mobile phone service receivable by the vehicle; directing a received personal call to the correct passenger if present; preventing an unrecognized speaker from starting the automobile by voice alone; etc.

Automatically identifying passengers also assists in processing natural language voice commands by giving meaning and differentiation that might not otherwise be apparent. For example, the command "Play my music" by a passenger can result in playback of music specific to that passenger at that passenger's location in the car. Likewise, a driver's command to "Mute all" might be applied to the entire vehicle whereas the same command spoken by a teenage passenger in the second row of seats might only result in the speakers corresponding to that seat being muted without affecting other passengers.

Additionally, for certain implementations, the MAS may also provide an identified person with the ability to transfer preferences and settings from one vehicle to another. This could be done directly between two vehicles in close proximity to each other via any of several short-range communications means (such as Bluetooth, etc.), through an intermediary device that is capable of interfacing with both vehicles (such as a smart phone that might store preferences and setting just for this purpose), or by networked means akin to social media sites like Facebook, Twitter, Google+, etc.

For several implementations disclosed herein, the identity of a passenger may give that passenger a higher priority for certain features regardless of their position in the vehicle. For example, the owner of an automobile may not always be the driver but could still enjoy certain features reserved for owners whenever they are in the vehicle. Likewise, when the identified persons constitute a family having parents and children, the parents should always have the ability to broadcast their voice to the whole vehicle regardless of the particular seat a parent may occupy. There are several contexts in which all of the passengers will benefit from the enhanced communications capabilities afforded by the MAS when, for example, speaking with other passengers in the vehicle when not next to each other.

Figure 14:
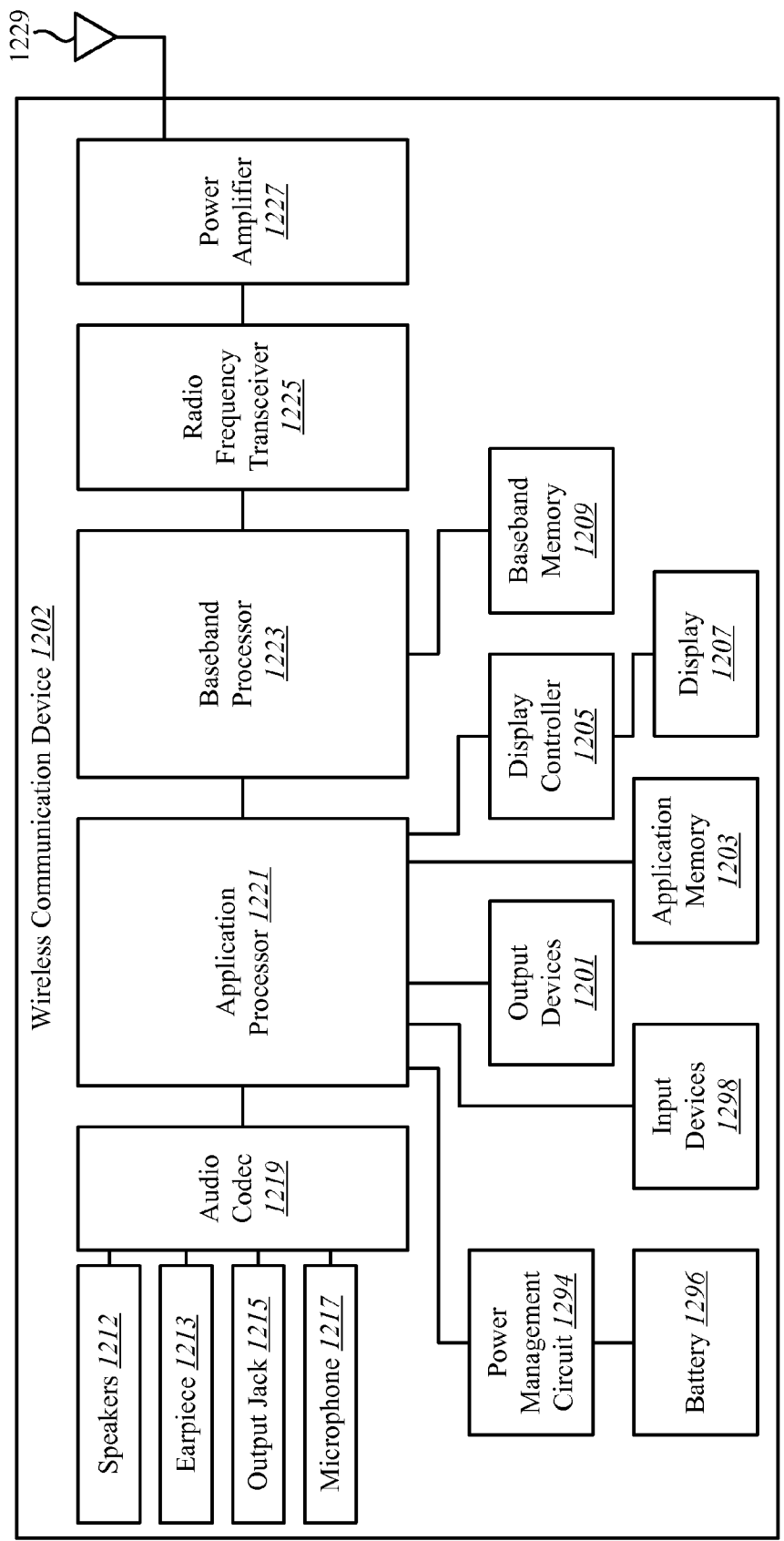
FIG. 14 is a block diagram illustrating one configuration of a wireless communication device in which aspects of various implementations herein disclosed may be implemented (at least in part)

FIG. 14 is a block diagram illustrating one configuration of a wireless communication device 1202 in which aspects of various implementations herein disclosed may be implemented (at least in part). The wireless communication device 1202 illustrated in FIG. 14 may be an example of one or more of the electronic devices described herein. The wireless communication device 1202 may include an application processor 1221. The application processor 1221 generally processes instructions (e.g., runs programs) to perform functions on the wireless communication device 1202. The application processor 1221 may be coupled to an audio coder/decoder (codec) 1219.

The audio codec 1219 may be used for coding and/or decoding audio signals. The audio codec 1219 may be coupled to at least one speaker 1212, an earpiece 1213, an output jack 1215 and/or at least one microphone 1217. The speakers 1212 may include one or more electro-acoustic transducers that convert electrical or electronic signals into acoustic signals. For example, the speakers 1212 may be used to play music or output a speakerphone conversation, etc. The earpiece 1213 may be another speaker or electro-acoustic transducer that can be used to output acoustic signals (e.g., speech signals) to a user. For example, the earpiece 1213 may be used such that only a user may reliably hear the acoustic signal. The output jack 1215 may be used for coupling other devices to the wireless communication device 1202 for outputting audio, such as headphones. The speakers 1212, earpiece 1213 and/or output jack 1215 may generally be used for outputting an audio signal from the audio codec 1219. The at least one microphone 1217 may be an acousto-electric transducer that converts an acoustic signal (such as a user's voice) into electrical or electronic signals that are provided to the audio codec 1219. In some configurations, the audio codec 1219 may perform one or more of the first stage processing and the second stage processing (and/or one or more of the other functions or procedures) described herein.

The application processor 1221 may also be coupled to a power management circuit 1294. One example of a power management circuit 1294 is a power management integrated circuit (PMIC), which may be used to manage the electrical power consumption of the wireless communication device 1202. The power management circuit 1294 may be coupled to a battery 1296. The battery 1296 may generally provide electrical power to the wireless communication device 1202. For example, the battery 1296 and/or the power management circuit 1294 may be coupled to at least one of the elements included in the wireless communication device 1202.

The application processor 1221 may be coupled to at least one input device 1298 for receiving input. Examples of input devices 1298 include infrared sensors, image sensors, accelerometers, touch sensors, keypads, etc. The input devices 1298 may allow user interaction with the wireless communication device 1202. The application processor 1221 may also be coupled to one or more output devices 1201. Examples of output devices 1201 include printers, projectors, screens, haptic devices, etc. The output devices 1201 may allow the wireless communication device 1202 to produce output that may be experienced by a user.

The application processor 1221 may be coupled to application memory 1203. The application memory 1203 may be any electronic device that is capable of storing electronic information. Examples of application memory 1203 include double data rate synchronous dynamic random access memory (DDRAM), synchronous dynamic random access memory (SDRAM), flash memory, etc. The application memory 1203 may provide storage for the application processor 1221. For instance, the application memory 1203 may store data and/or instructions for the functioning of programs that are run on the application processor 1221.

The application processor 1221 may be coupled to a display controller 1205, which in turn may be coupled to a display 1207. The display controller 1205 may be a hardware block that is used to generate images on the display 1207. For example, the display controller 1205 may translate instructions and/or data from the application processor 1221 into images that can be presented on the display 1207. Examples of the display 1207 include liquid crystal display (LCD) panels, light emitting diode (LED) panels, cathode ray tube (CRT) displays, plasma displays, etc.

The application processor 1221 may be coupled to a baseband processor 1223. The baseband processor 1223 generally processes communication signals. For example, the baseband processor 1223 may demodulate and/or decode received signals. Additionally or alternatively, the baseband processor 1223 may encode and/or modulate signals in preparation for transmission.

The baseband processor 1223 may be coupled to baseband memory 1209. The baseband memory 1209 may be any electronic device capable of storing electronic information, such as SDRAM, DDRAM, flash memory, etc. The baseband processor 1223 may read information (e.g., instructions and/or data) from and/or write information to the baseband memory 1209. Additionally or alternatively, the baseband processor 1223 may use instructions and/or data stored in the baseband memory 1209 to perform communication operations.

The baseband processor 1223 may be coupled to a radio frequency (RF) transceiver 1225. The RF transceiver 1225 may be coupled to a power amplifier 1227 and one or more antennas 1229. The RF transceiver 1225 may transmit and/or receive radio frequency signals. For example, the RF transceiver 1225 may transmit an RF signal using a power amplifier 1227 and at least one antenna 1229. The RF transceiver 1225 may also receive RF signals using the one or more antennas 1229.

Figure 15:
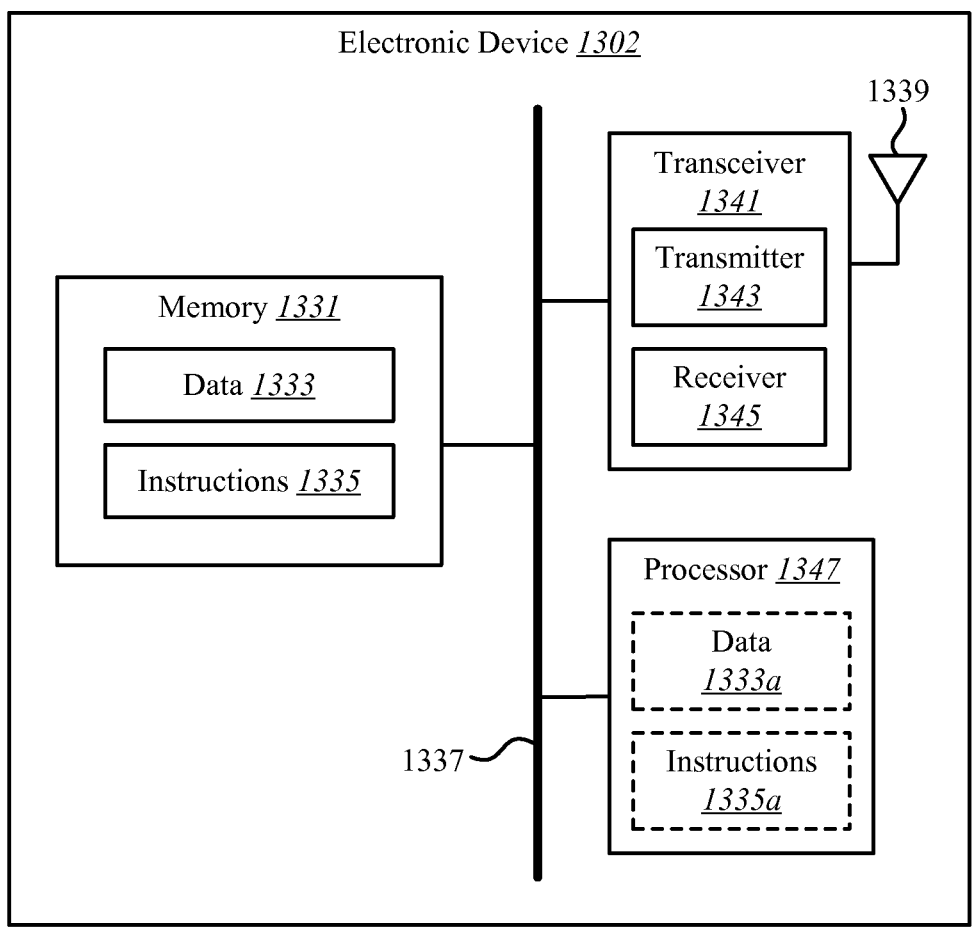
FIG. 15 illustrates certain components that may be included within an electronic device for implementing various implementations disclosed herein (at least in part).

FIG. 15 illustrates certain components that may be included within an electronic device 1302 for implementing various implementations disclosed herein (at least in part). The electronic device 1302 described in connection with FIG. 15 may be an example of and/or may be implemented in accordance with one or more of the electronic devices described herein.

The electronic device 1302 includes a processor 1347. The processor 1347 may be a general purpose single- or multi-chip microprocessor (e.g., an ARM), a special purpose microprocessor (e.g., a digital signal processor (DSP)), a microcontroller, a programmable gate array, etc. The processor 1347 may be referred to as a central processing unit (CPU). Although just a single processor 1347 is shown in the electronic device 1302 of FIG. 15, in an alternative configuration, a combination of processors (e.g., an ARM and DSP) could be used.

The electronic device 1302 also includes memory 1331 in electronic communication with the processor 1347 (i.e., the processor 1347 can read information from and/or write information to the memory 1331). The memory 1331 may be any electronic component capable of storing electronic information. The memory 1331 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1333 and instructions 1335 may be stored in the memory 1331. The instructions 1335 may include one or more programs, routines, sub-routines, functions, procedures, code, etc. The instructions 1335 may include a single computer-readable statement or many computer-readable statements. The instructions 1335 may be executable by the processor 1347 to implement one or more of the methods described above. Executing the instructions 1335 may involve the use of the data 1333 that is stored in the memory 1331. FIG. 15 shows some instructions 1335a and data 1333a being loaded into the processor 1347.

The electronic device 1302 may also include a transmitter 1343 and a receiver 1345 to allow transmission and reception of signals between the electronic device 1302 and a remote location (e.g., a base station). The transmitter 1343 and receiver 1345 may be collectively referred to as a transceiver 1341. An antenna 1339 may be electrically coupled to the transceiver 1341. The electronic device 1302 may also include (not shown) multiple transmitters, multiple receivers, multiple transceivers and/or multiple antenna.

The various components of the electronic device 1302 may be coupled together by one or more buses, which may include a power bus, a control signal bus, a status signal bus, a data bus, etc. For simplicity, the various buses are illustrated in FIG. 15 as a bus system 1337.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. Moreover, the phrase "based on" does not mean "based only on," unless expressly specified otherwise. In other words, the phrase "based on" describes both "based only on" and "based at least on."

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular figure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof Design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of the implementations of the methods described with respect to the various Figures, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed—at least in part—by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Stated differently, it is to be understood that the claims are not limited to the precise configuration and components illustrated above, and the various modifications, changes and variations may be made in the arrangement, operation and details of the systems, methods, and apparatus described herein without departing from the scope of the claims.

Furthermore, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims that follow.

What is claimed is:

1. A method for enhancing an auditory experience in a shared acoustic space comprising a plurality of zones, the method comprising:
   receiving, at a plurality of microphones distributed throughout the shared acoustic space, sound signals substantially originating from the plurality of zones;
   filtering, at a plurality of adaptable sound filters, audio data corresponding to the sound signals received at the plurality of microphones to cancel at least one of an echo signal or a feedback signal to generate filtered audio data; and
   providing a conference call facility configured to generate, based on the filtered audio data, output data associated with a multi-dimensional acoustic effect to simulate, at a remote device positioned external to the shared acoustic space, a virtual positioning of one or more occupants of the shared acoustic space, wherein the output data indicates a virtual position of an occupant of the one or more occupants, the virtual position determined based on an identity of the occupant.

2. The method of claim 1, wherein the conference call facility is provided by a mobile communication device operationally coupled to a multichannel acoustic system via a mobile communication interface of the mobile communication device, and further comprising receiving a biometric identifier corresponding to the occupant, wherein the identity of the occupant is determined based on the biometric identifier.

3. The method of claim 2, wherein the biometric identifier comprises a voice of the occupant, wherein a second virtual position of a second occupant of the one or more occupants is based on a second identity of the second occupant, wherein the virtual positioning of the one or more occupants corresponds to acoustically simulating that the one or more occupants are positioned around a table, and further comprising providing an interface capable of operationally coupling a portable device located in each zone of the plurality of zones to the multichannel acoustic system.

4. The method of claim 2, wherein the shared acoustic space comprises an interior passenger compartment of a transportation vehicle for persons, wherein the multichannel acoustic system is configured to identify and authenticate at least one passenger of the transportation vehicle, and wherein the conference facility is further configured to generate a second multi-dimensional acoustic effect that simulates a virtual positioning within the shared acoustic space of a conference call participant located external to the shared acoustic space such that the occupant perceives the conference call participant to be positioned at a particular location within the shared acoustic space.

5. The method of claim 1, further comprising:
receiving a biometric identifier corresponding to the occupant;
determining the identity of the occupant based on the biometric identifier;
determining the virtual position of the occupant based on the identity of the occupant,
wherein the biometric identifier comprises a voice of the occupant, an image of the occupant, or a weight of the occupant; and
transmitting the output data to the remote device.

6. A multichannel acoustic system for enhancing an auditory experience in a shared acoustic space comprising a plurality of zones, the system comprising:
a plurality of loudspeakers located within the shared acoustic space;
a receiver coupled to a plurality of microphones and distributed throughout the shared acoustic space, the plurality of microphones configured to receive sound signals substantially originating from the plurality of zones;
a plurality of adaptable sound filters configured to generate filtered audio data by canceling at least one of an echo signal or a feedback signal of the audio data corresponding to the sound signals received via the plurality of microphones; and
a conference call facility configured to generate, based on the filtered audio data, output data associated with a multi-dimensional acoustic effect to simulate, at a remote device positioned external to the shared acoustic space, a virtual positioning of one or more occupants of the shared acoustic space, wherein the output data indicates a virtual position of an occupant of the one or more occupants, the virtual position determined based on an identity of the occupant.

7. The multichannel acoustic system of claim 6, wherein the conference call facility comprises a mobile communication device operationally coupled to the multichannel acoustic system via a mobile communication interface of the mobile communication device, and further comprising an interface configured to receive a biometric identifier corresponding to the occupant.

8. The multichannel acoustic system of claim 6, wherein the conference call facility includes an interface capable of operationally coupling a portable device located in each zone of the plurality of zones to the multichannel acoustic system.

9. The multichannel acoustic system of claim 6, wherein the shared acoustic space comprises an interior passenger compartment of a transportation vehicle, and further comprising at least one sensor configured to receive an input, wherein the plurality of loudspeakers are positioned within the shared acoustic space and configured to generate a sound based on the input, wherein the sound corresponds to a warning, and wherein a quantity and a position of the plurality of loudspeakers at which the sound is generated is based on an identified hazard corresponding to the warning.

10. The multichannel acoustic system of claim 6, wherein the plurality of loudspeakers is configured to provide navigation information to a driver of a vehicle, the navigation information including a directional context indicative of a direction of the navigation information.

11. An apparatus for enhancing an auditory experience in a shared acoustic space comprising a plurality of zones, the apparatus comprising:

means for receiving via a plurality of microphones distributed throughout the shared acoustic space, sound signals substantially originating from the plurality of zones;
means for filtering, at a plurality of adaptable sound filters, audio data corresponding to the sound signals received via the plurality of microphones to generate filtered audio data by canceling at least one of an echo signal or a feedback signal; and
means for providing a conference call facility that is configured to generate, based on the filtered audio data, output data associated with a multi-dimensional acoustic effect to simulate, at a remote device positioned external to the shared acoustic space, a virtual positioning of one or more occupants of the shared acoustic space, wherein the output data indicates a virtual position of an occupant of the one or more occupants, the virtual position determined based on an identity of the occupant.

12. The apparatus claim 11, wherein the means for providing the conference call facility comprises a mobile communication device operationally coupled to a multichannel acoustic apparatus via a mobile communication interface of the mobile communication device, and, further comprising means for receiving a biometric identifier corresponding to the occupant, wherein the identity of the occupant is determined based on the biometric identifier.

13. The apparatus of claim 11, further comprising means for operationally coupling a portable device located in each zone of the plurality of zones to a multichannel acoustic system.

14. The apparatus of claim 11, further comprising means for authenticating at least one person associated with a transportation vehicle.

15. The apparatus of claim 11, further comprising means for providing navigation information associated with a vehicle, the navigation information comprising a directional context indicative of a direction of the navigation information.

16. A non-transitory computer readable medium comprising computer-executable instructions that enhance an auditory experience in a shared acoustic space comprising a plurality of zones, the computer-executable instructions comprising instructions for:
filtering, at a plurality of adaptable sound filters, audio data corresponding to sound signals received via a plurality of microphones distributed throughout the shared acoustic space to cancel at least one of an echo signal or a feedback signal to generate filtered audio data; and
providing a conference call facility configured to generate, based on the filtered audio data, output data associated with a multi-dimensional acoustic effect to simulate, at a remote device positioned external to the shared acoustic space, a virtual positioning of one or more occupants of the shared acoustic space, wherein the output data indicates a virtual position of an occupant of the one or more occupants, the virtual position determined based on an identity of the occupant.

17. The non-transitory computer readable medium of claim 16, further comprising instructions for providing an interface capable of operationally coupling a portable device located in each zone of the plurality of zones.

18. The non-transitory computer readable medium of claim 16, wherein the shared acoustic space comprises an interior passenger compartment of a transportation vehicle.

19. The non-transitory computer readable medium of claim 18, further comprising instructions for providing navigation information via one or more speakers of the transportation vehicle, the navigation information comprising a directional context indicative of a direction of the navigation information.

* * * * *